(12) United States Patent
Mizuno

(10) Patent No.: US 7,356,880 B2
(45) Date of Patent: Apr. 15, 2008

(54) HINGE STRUCTURE OF MICROMIRROR DEVICE

(75) Inventor: Rogerio Jun Mizuno, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 266 days.

(21) Appl. No.: 11/187,984

(22) Filed: Jul. 25, 2005

(65) Prior Publication Data

US 2006/0018049 A1    Jan. 26, 2006

(30) Foreign Application Priority Data

Jul. 26, 2004   (JP)   ............................. 2004-216679
Jul. 26, 2004   (JP)   ............................. 2004-216680

(51) Int. Cl.
    *E05F 1/08*    (2006.01)
(52) U.S. Cl. ........................... 16/277; 16/225; 16/222; 16/280; 16/367
(58) Field of Classification Search ............... 16/277, 16/225, 280–282, 367, 221–223; 359/291, 359/198, 292, 293, 220–224, 320, 323; 310/309
    See application file for complete search history.

(56) References Cited

U.S. PATENT DOCUMENTS

| | | | |
|---|---|---|---|
| 4,730,200 A | | 3/1988 | Kitazawa |
| 5,116,457 A | * | 5/1992 | Jerman ........................ 438/53 |
| 6,075,239 A | * | 6/2000 | Aksyuk et al. ............. 250/229 |
| 6,128,122 A | * | 10/2000 | Drake et al. ................ 359/224 |
| 6,431,714 B1 | * | 8/2002 | Sawada et al. ............. 359/879 |
| 6,501,588 B1 | * | 12/2002 | Rosa et al. .................. 359/290 |
| 6,936,950 B2 | * | 8/2005 | Akagawa et al. ........... 310/309 |
| 6,995,499 B2 | * | 2/2006 | Hwang ........................ 310/328 |
| 7,095,546 B2 | * | 8/2006 | Mala et al. .................. 359/290 |
| 2005/0018322 A1 | * | 1/2005 | Ben-Gad et al. ............ 359/846 |
| 2005/0136663 A1 | * | 6/2005 | Terence Gan et al. ...... 438/689 |

FOREIGN PATENT DOCUMENTS

| | | |
|---|---|---|
| JP | 5-076186 | 3/1993 |
| JP | 2000-147419 | 5/2000 |
| JP | 2003-29172 | 1/2003 |

OTHER PUBLICATIONS

English language Abstract of JP 5-076186.
English language Abstract of JP 2000-147419.
English language Abstract of JP 2003-29172.

* cited by examiner

*Primary Examiner*—Chuck Y. Mah
(74) *Attorney, Agent, or Firm*—Greenblum & Bernstein, P.L.C.

(57) ABSTRACT

A hinge structure includes a rotatable plate member, a frame member, a spring member that connects the rotatable plate member with the frame member at each of two opposite positions along a rotation axis. The spring member includes a first axial section, a second axial section. An end of the first axial section is connected to the frame member, and an end of the second axial section is connected to the rotatable plate member. The spring member includes a first zigzag section and a second zigzag section formed on opposite sides with respect to the rotation axis, each of the first and second zigzag sections including parallel portions which are parallel with each other and with the rotation axis and bent portions each connecting adjacent parallel portions. A predetermined gap between the first and second axial section is smaller than a length of the parallel portions.

20 Claims, 18 Drawing Sheets

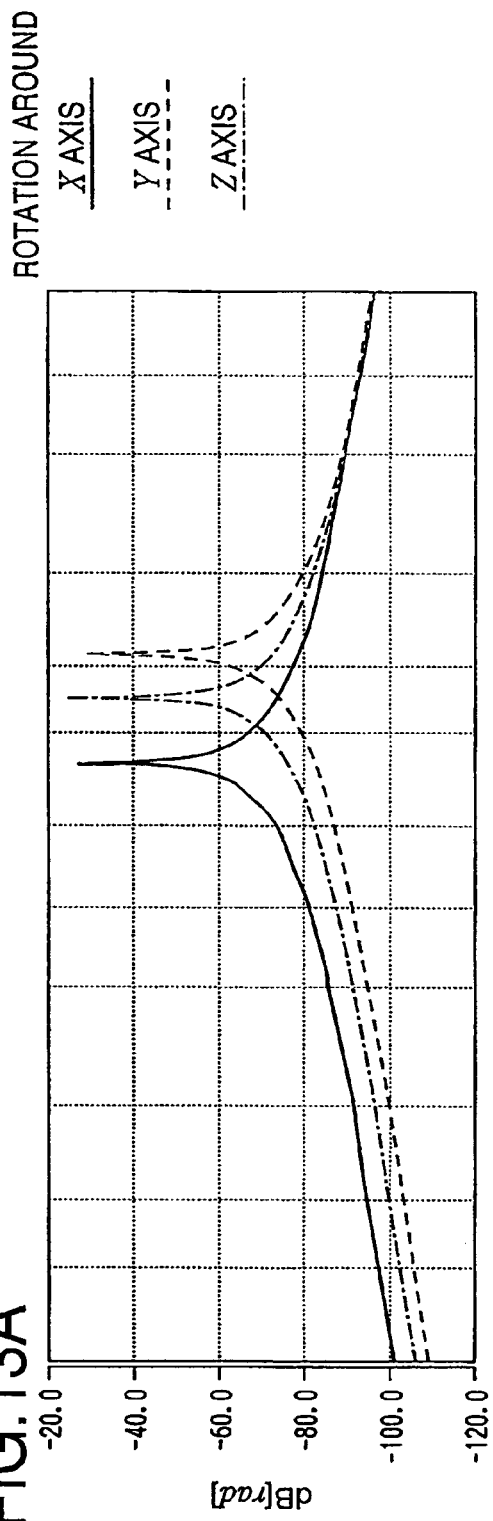
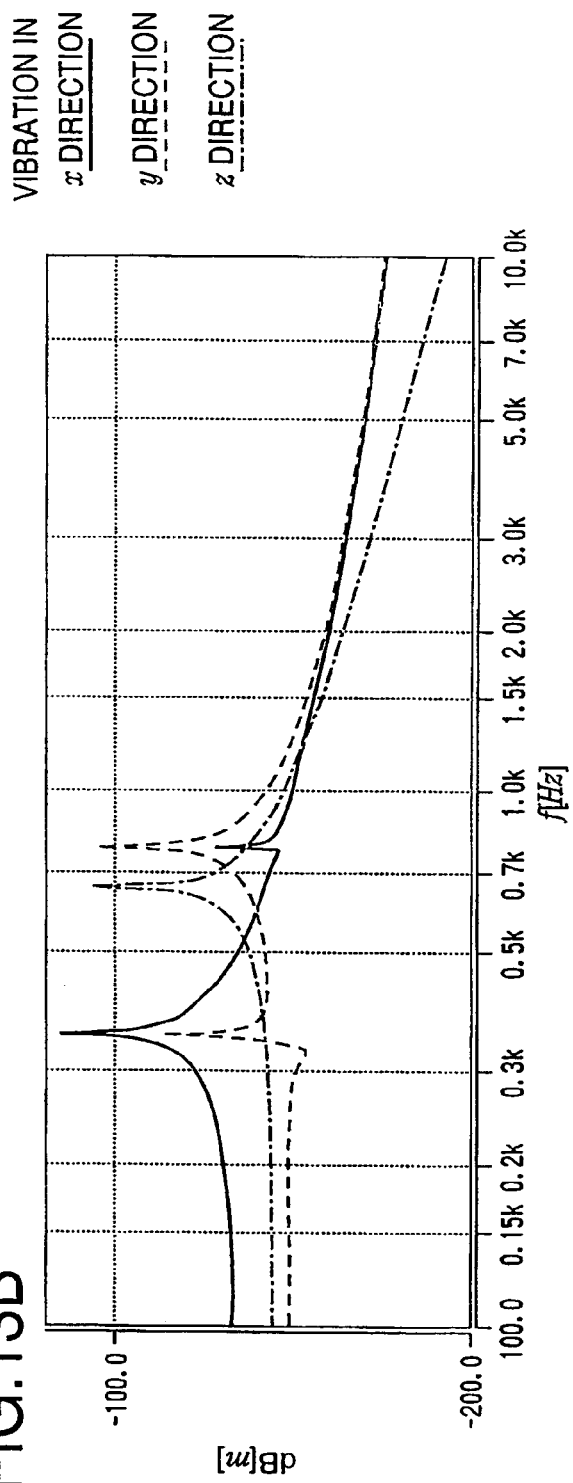
FIG.13A
FIG.13B

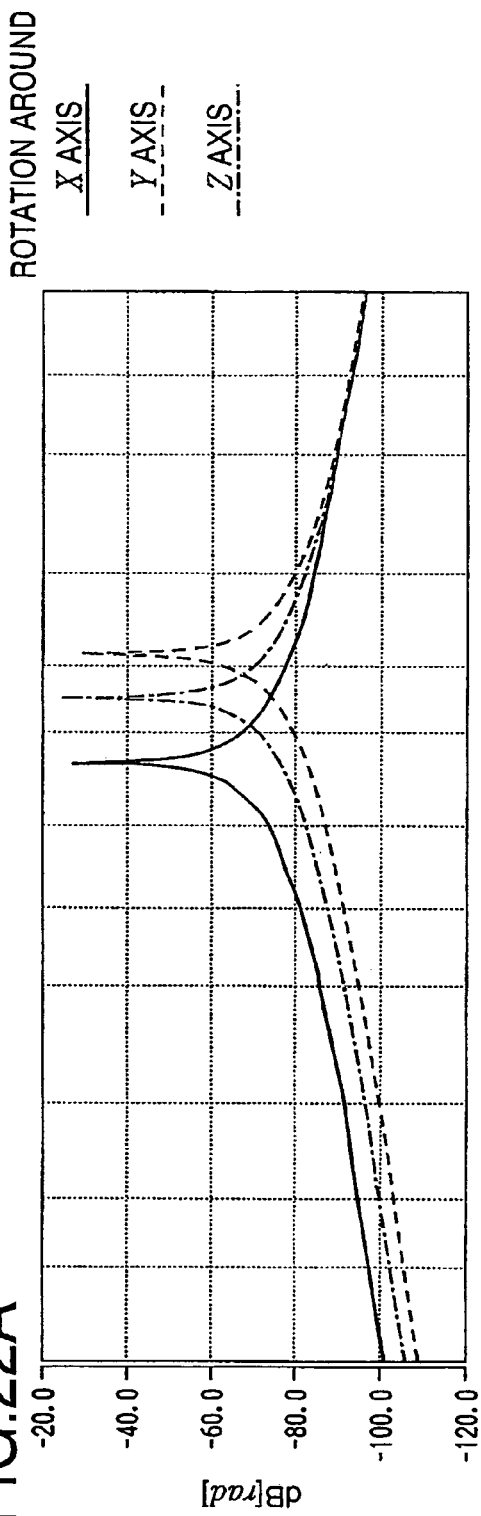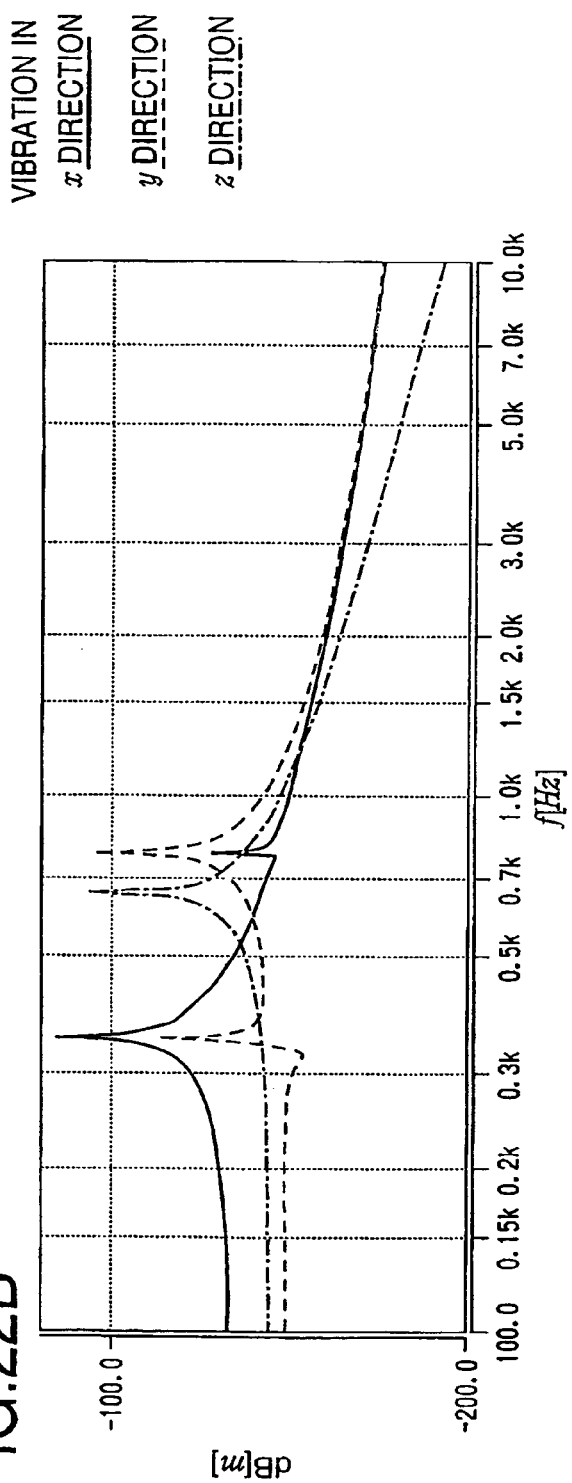

HINGE STRUCTURE OF MICROMIRROR DEVICE

BACKGROUND OF THE INVENTION

The present invention relates to a hinge structure for rotatably supporting a mirror surface of a micromirror device for scanning a beam.

Micromirror devices have widely been used in various technical fields like optical switches for communication, measuring instruments, scanners, etc. For example, in a micromirror device of a capacitance type, a mirror surface for scanning an incident beam is rotatably supported by a hinge structure having elasticity and a plurality of electrodes are arranged on a substrate placed under the mirror surface. By applying voltage to a proper electrode, electrostatic attraction is caused between the electrode and the mirror surface and thereby the mirror surface is tilted in a desired direction. In recent years, micromirror devices are being required to widen their beam scan range by tilting the mirror surface by a larger tilt angle. For this purpose, the hinge structure is required to improve its spring performance, that is, to bend or twist more flexibly. Under the circumstances, not only simple rod-like hinge structures but also various types of hinge structures have recently been proposed as disclosed in Japanese Patent Provisional Publication No. 2003-29172, for example.

A study of conventional hinge structures employing the finite element method, etc. has proved that the spring performance changes inversely proportional to the size of the hinge structure. For example, in a hinge structure of the so-called continuous z-fold type (thin material alternately folded in directions orthogonal to an axis) described in the publication, the size of the hinge structure measured in a direction orthogonal to the rotation axis of the mirror surface has to be increased in order to improve the spring performance. However, designing the hinge structure too large can cause a drop in the strength of the whole mirror layer in which the mirror surface is formed.

SUMMARY OF THE INVENTION

The present invention is advantageous in that it provides a hinge structure for rotatably supporting a mirror surface of a micromirror device for scanning a beam, delivering high spring performance while being small-sized.

According to an aspect of the invention, there is provided a hinge structure, which is provided with a rotatable plate member, a frame member, a spring member that connects the rotatable plate member with the frame member at each of two opposite positions along a rotation axis so that the rotatable plate member rotates about the rotation axis with respect to the frame member. Further, the spring member includes a first axial section, a second axial section, an end of the first axial section being connected to the frame member, an end of the second axial section being connected to the rotatable plate member, a predetermined gap being formed between another end of the first axial section and another end of the second axial section, a first zigzag section and a second zigzag section formed on opposite sides with respect to the rotation axis, each of the first and second zigzag sections including parallel portions which are parallel with each other and with the rotation axis and bent portions each connecting adjacent parallel portions, the bent portions being arranged in a direction perpendicular to the rotation axis, the predetermined gap being smaller than a length of the parallel portions. An end of the first zigzag section is connected to the other end of the first axial section, an end of the second zigzag section is connected to the other end of the second axial section, and the other end of the first zigzag section is connected to the other end of the second zigzag section.

The predetermined gap may be smaller than a length of the parallel portions.

Geometry of the hinge structure may be symmetrical about a point at which the other end of the first zigzag section is connected to the other end of the second zigzag section.

The parallel portions of each zigzag section may be arranged at every predetermined interval.

The predetermined interval S may satisfy a following condition:

$$4\ \mu m \leq S \leq 8\ \mu m.$$

The hinge structure may be formed of an SOI wafer.

A width W of the spring member satisfies a following condition:

$$2\ \mu m \leq W \leq 4\ \mu m.$$

A thickness T of the spring member may satisfy a following condition:

$$7\ \mu m \leq T \leq 13\ \mu m.$$

According to another aspect of the invention, there is provided a hinge structure, which includes a rotatable plate member, a frame member, a spring member that connects the rotatable plate member with the frame member at each of two opposite positions along a rotation axis so that the rotatable plate member rotates about the rotation axis with respect to the frame member. Further, the spring member may include a first axial section, a second axial section, an end of the first axial section being connected to the frame member, an end of the second axial section being connected to the rotatable plate member, a predetermined gap being formed between another end of the first axial section and another end of the second axial section. A first zigzag section and a second zigzag section may be arranged on both sides of the first axial section, respectively, and a third zigzag section and a fourth zigzag section are arranged on both sides of the second axial section, respectively. Each of the first, second, third and fourth zigzag sections may include a plurality of parallel portions which are parallel with each other and with the rotation axis, and bent portions each connecting adjacent parallel portions, the bent portions being arranged in a direction perpendicular to the rotation axis. An end of the first zigzag section is connected to the other end of the first axial section, another end of the first zigzag section is connected to an end of the second zigzag section, another end of the second zigzag section is connected to an end of the third zigzag section, another end of the third zigzag section is connected to an end of the fourth zigzag section, and another end of the fourth zigzag section is connected to the other end of the second axial section.

The predetermined gap may be smaller than a length of the parallel portions.

Geometry of the hinge structure may be point symmetrical.

The parallel portions of each zigzag section may be arranged at every predetermined interval.

The predetermined interval S may satisfy a following condition:

$$4\ \mu m \leq S \leq 8\ \mu m.$$

The hinge structure may be formed of an SOI wafer.

A width W of the spring member may satisfy a following condition:

2 µm≦W≦4 µm.

A thickness T of the spring member may satisfy a following condition:

7 µm≦T≦13 µm.

According to a further aspect of the invention, there is provided a hinge structure, which includes a rotatable plate member, a frame member, spring member that connects the rotatable plate member with the frame member at each of two opposite positions along a rotation axis so that the rotatable plate member rotates about the rotation axis with respect to the frame member. The spring member may include a first axial section, a second axial section, an end of the first axial section being connected to the frame member, an end of the second axial section being connected to the rotatable plate member, a predetermined gap being formed between another end of the first axial section and another end of the second axial section, and a plurality of zigzag sections successively connected between the first axial section and the second axial section. One end of the plurality of successively connected zigzag sections may be connected to the other end of the first axial section, and another end of the plurality of successively connected zigzag sections may be connected to another end of the second axial section. Each of the plurality of zigzag sections may include a plurality of parallel portions which are parallel with the rotation axis, and the plurality of zigzag sections may be formed and arranged point symmetrically with respect to a center of the hinge structure.

The predetermined gap may be smaller than a length of the parallel portions.

The parallel portions of each zigzag section may be arranged at every predetermined interval.

The hinge structure may be formed of an SOI wafer.

BRIEF DESCRIPTION OF THE DRAWINGS

The objects and features of the present invention will become more apparent from the consideration of the following detailed description taken in conjunction with the accompanying drawings, in which:

FIGS. 13A and 13B show frequency response functions for the hinge structure of the comparative example;

FIGS. 22A and 22B show frequency response functions for the hinge structure of the comparative example;

DETAILED DESCRIPTION OF THE EMBODIMENTS

Hereinafter, embodiments of the invention will be described with reference to the accompanying drawings.

Figure 1:
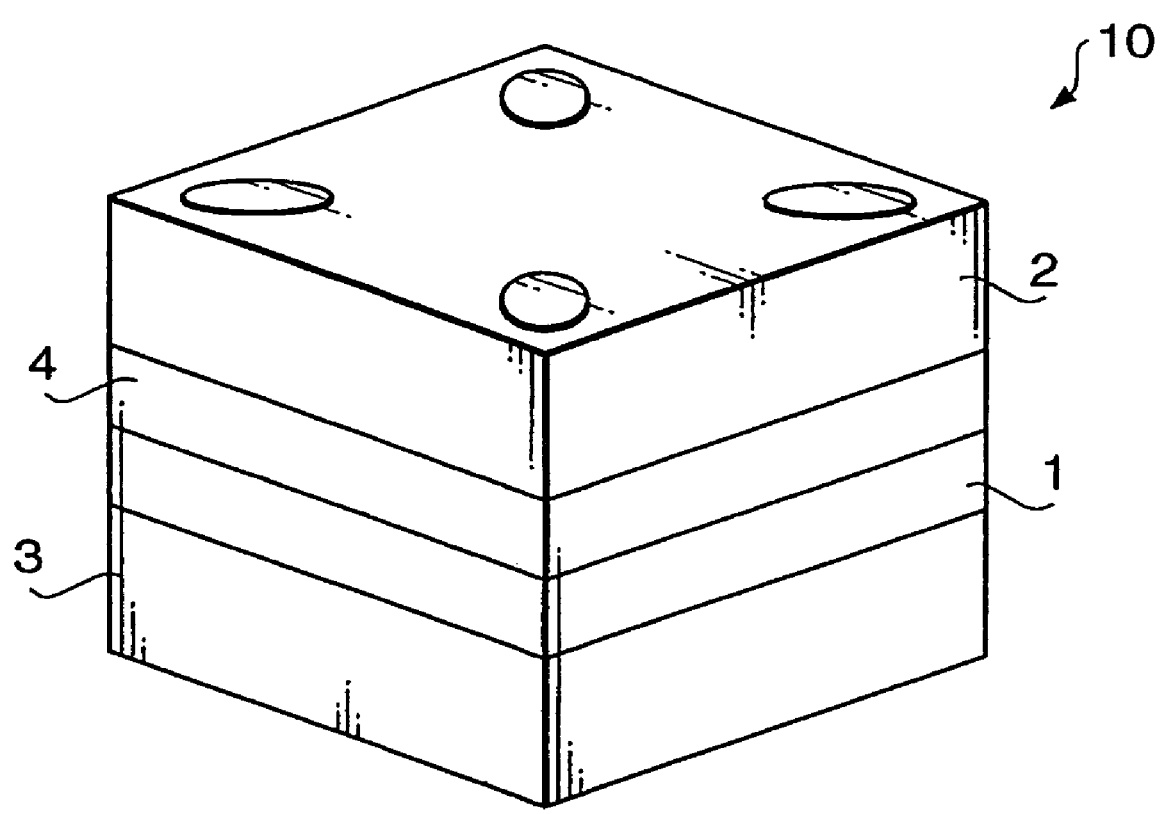
FIG. 1 is a perspective view showing the overall composition of a micromirror device including a hinge structure in accordance with a first embodiment of the present invention.
Figure 2:
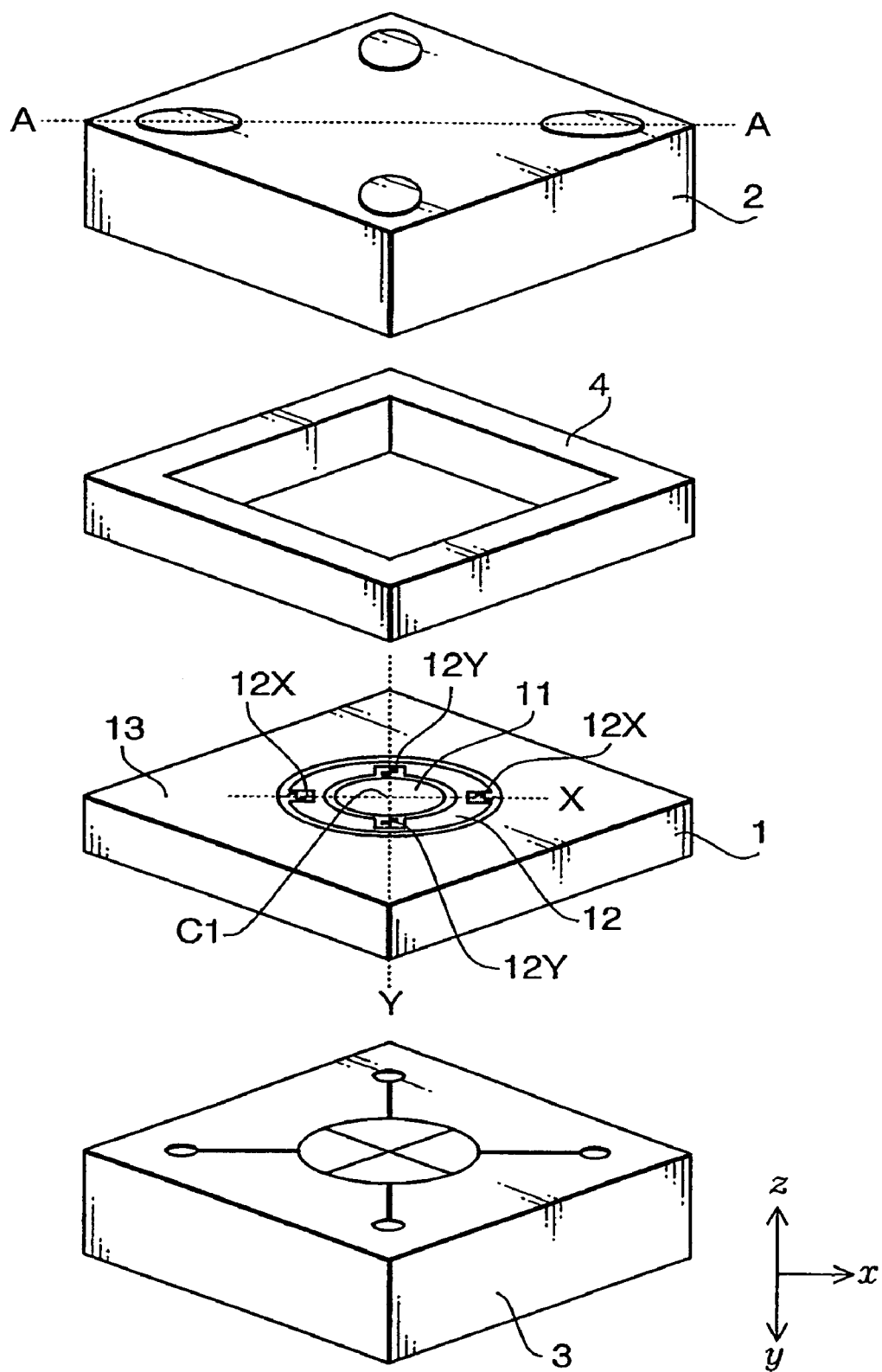
FIG. 2 is a perspective view showing components of the micromirror device in a disassembled state.

FIG. 1 is a perspective view showing the overall composition of a micromirror device 10 including a hinge structure in accordance with an embodiment (first embodiment) of the present invention. FIG. 2 is a perspective view showing components of the micromirror device 10 in a disassembled state. Incidentally, the micromirror device shown in FIGS. 1 and 2 is a biaxial micromirror device capable of rotating the mirror around two axes: a first axis (hereinafter referred to as an "X axis") in a first direction (x direction) and a second axis (hereinafter referred to as a "Y axis") in a second direction (y direction) orthogonal to the first direction. In addition, it is noted that a third direction (z direction) shown in FIG. 2 is perpendicular to each of the first and second directions.

As shown in FIGS. 1 and 2, the micromirror device 10 includes an upper substrate 2 and a lower substrate 3 stacked up to sandwich a mirror layer 1. The upper substrate 2 is stacked on the mirror layer 1 via a spacer 4, and thus the micromirror device 10 includes the upper substrate 2, the spacer 4, the mirror layer 1 and the lower substrate 3 from its light incident side. In this description, part of the micromirror device 10 in the light incident side is defined as an "upper part" and the other part is defined as a "lower part" for the sake of convenience.

Figure 3:
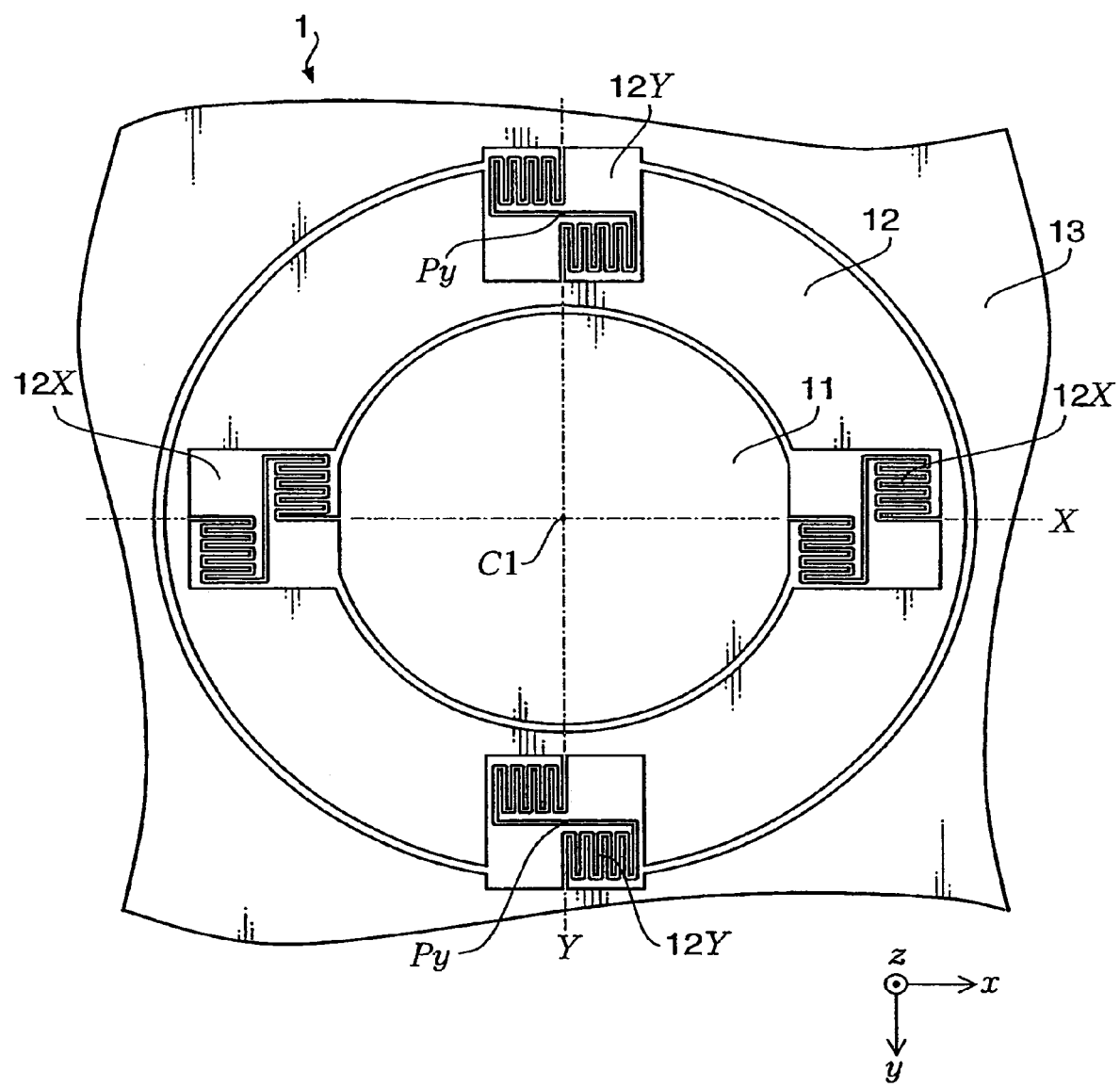
FIG. 3 is an enlarged top view showing a mirror layer of the micromirror device.

FIG. 3 is an enlarged top view showing the mirror layer 1. As shown in FIGS. 2 and 3, the mirror layer 1 includes a circular mirror surface 11 placed in a central part of the mirror layer 1, a ring-shaped frame 12 placed to surround the periphery of the mirror surface 11, and an outer frame 13 formed to surround the frame 12. The frame 12 is provided with a pair of hinge structures 12X arranged in the x direction (hereinafter referred to as "first hinge structures 12X") and another pair of hinge structures 12Y arranged in the y direction (hereinafter referred to as "second hinge structures 12Y").

Each first hinge structure 12X is joined to the mirror surface 11 at one end, while being joined to the frame 12 at the other end. Therefore, the first hinge structures 12X support the mirror surface 11 to be rotatable around the X axis in the x direction. Meanwhile, each second hinge structure 12Y is joined to the frame 12 at one end, while being connected to the outer frame 13 at the other end. Therefore, the second hinge structures 12Y support the frame 12 and the mirror surface 11 to be rotatable around the Y axis in the y direction. In FIG. 3, the X and Y axes are indicated with chain lines (broken lines in FIG. 2) and the intersection of the two axes (the center of the mirror surface 11) is indicated with a reference character "C1".

Figure 4:
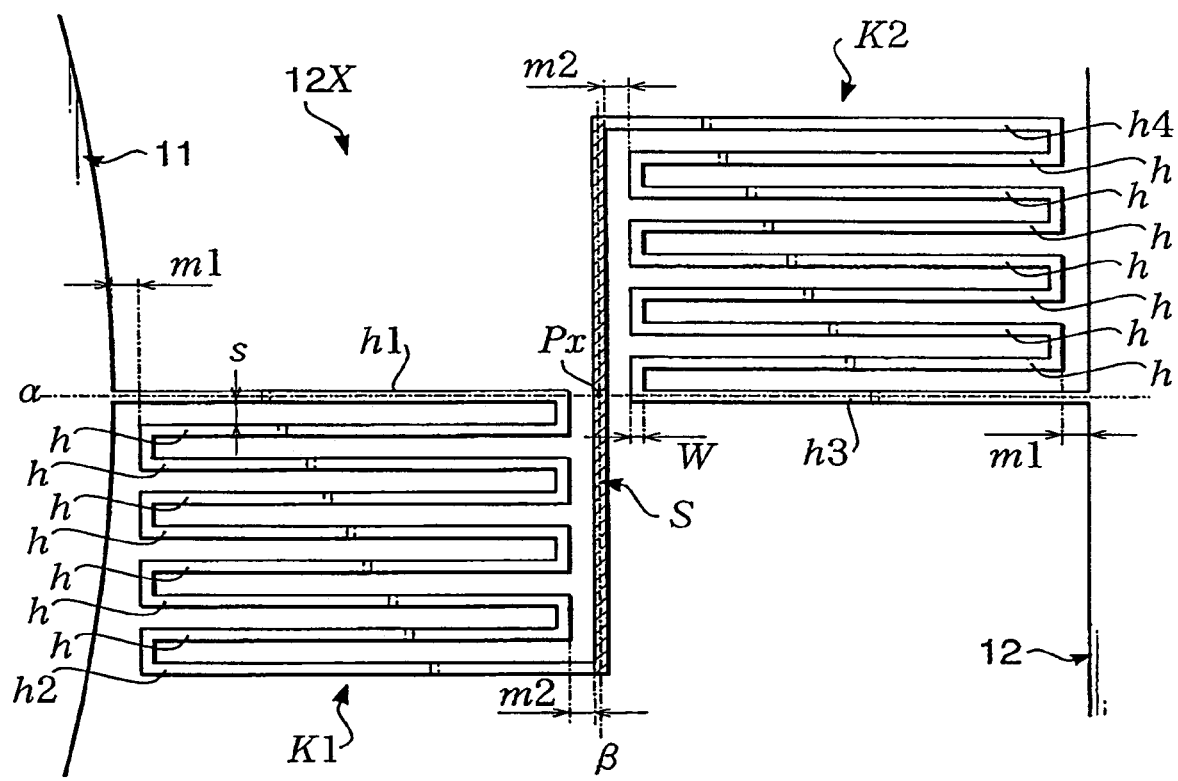
FIG. 4 is an enlarged view showing the overall composition of the hinge structure in accordance with the first embodiment.

In the following, the first hinge structure 12X will be explained in detail. FIG. 4 is an enlarged view showing the first hinge structure 12X, in which the X axis is indicated with a broken line. As shown in FIG. 4, the first hinge structure 12X is formed by bending a spring member into a prescribed geometrical shape. It is noted that in order to explain the concrete composition of the first hinge structure 12X, the same axis as the X axis in FIGS. 2 and 3 is referred to as a rotation axis α in FIG. 4 for the sake of convenience. In addition, the center point, which is located on the rotation axis α, of the linear segment extending from the joint of the mirror surface 11 with the first hinge structure 12X to the joint of the frame 12 with the first hinge structure 12X is referred to as a center of the hinge structure, which is shown as a point Px in FIG. 4. Furthermore, an axis that is passing through the center Px and perpendicular to the rotation axis α is referred to as an orthogonal axis β.

The spring member is configured so that its width W [μm] (see FIG. 4) and thickness T [μm] (see FIG. 6A) will satisfy the following conditions (1) and (2), respectively:

$$2 \leq W \leq 4 \quad (1)$$

$$7 \leq T \leq 13 \quad (2)$$

The first hinge structure 12X of this embodiment is formed of a spring member having a width W of 3 μm and a thickness T of 10 μm. By forming the first hinge structure 12X with a spring member satisfying the conditions (1) and (2), high spring performance of the first hinge structure 12X is achieved.

The first hinge structure 12X formed of a single spring member will be described below partitioning it into three parts: a first folded spring structure K1, a second folded spring structure K2, and a joint portion S, for convenience of explanation. In FIG. 4, the joint portion S is shown as a shaded pattern for the sake of clearly identifying each portion.

The first folded spring structure K1 is formed by folding the spring member a plurality of times such that the longitudinal direction thereof is substantially parallel to the rotation axis α. In the first folded spring structure K1, portions parallel to the rotation axis α are referred to as parallel portions h. According to this embodiment, the spring member is folded substantially perpendicularly to form the first folded spring structure K1. Therefore, the parallel portions h are aligned along a parallel direction to the orthogonal axis β. All of the parallel portions h have the same length. In the first folded spring structure K1, a pair of parallel portions that are located at the most outer sides among the plurality of parallel portions is referred to as first and second outer parallel portions h1 and h2. The first outer parallel portion h1 is located on the rotation axis α, and an end (one of the ends of the spring member) is connected with the mirror surface 11 that is rotatable. The second outer parallel portion h2, in the first folded spring structure K1, is located farthest from the rotation axis α, and one of the ends thereof is connected with the below-mentioned joint portion S.

The second folded spring structure K2 has the same composition as the first folded spring structure K1. However, it is noted that a direction along which the parallel portions h are aligned in the second folded spring structure K2 is opposite to the direction along which the parallel portions h are aligned in the first folded spring structure K1 with respect to the rotation axis α. In the second folded spring structure K2, a pair of parallel portions that are located at the most outer sides among the plurality of parallel portions is referred to as third and fourth outer parallel portions h3 and h4. The third outer parallel portion h3 is located on the rotation axis α, and an end thereof (the other of the ends of the spring member) is connected with the frame 12 that is non-rotatable. The fourth outer parallel portion h4, in the second folded spring structure K2, is located farthest from the rotation axis α, and one of the ends thereof is connected with the below-mentioned joint portion S.

In addition, in order to uniformly disperse stress that is generated while tilting the mirror surface 11, an interval that is formed by folding the spring member, that is, an interval s between any two parallel portions h laying side by side in the orthogonal axis β direction is the same. The interval s [μm] is designed to satisfy the following condition (3):

$$4 \leq s \leq 8 \quad (3)$$

Such hinge composition as to satisfy the condition (3) enables to obtain a small hinge structure with high spring performance by optimizing the spring constant with respect to torsion. In the first hinge structure 12X of this embodiment, the interval s is set to 6 µm. An interval between any two adjacent parallel portions, in each pair of folded spring structures K1 and K2, is configured to satisfy the condition (3) as well.

The joint portion S is a linear-segment-like portion that is located on and along the orthogonal axis β. Thereby, it is possible to keep good balance and high performance of the whole first hinge structure 12X. The joint portion S connects both ends thereof with the respective ends of the second outer parallel portion h2 and the fourth outer parallel portion h4 to connect the folded spring structures K1 and K2 with one another.

In order to avoid contact between the mirror surface 11 and the first folded spring structure K1, the first outer parallel portion h1 has an extension part that extends longer than other parallel portions h to the mirror surface 11 by a predetermined length of m1. Similarly, in order to avoid contact between to the frame 12 and the second folded spring structure K2, the third outer parallel portion h3 has an extension part that is extending longer than other parallel portions h to the frame 12 by a predetermined length of m1. Moreover, in order to avoid contact between the joint portion S and each of the folded spring structures K1 and K2, the second and fourth outer parallel portions h2 and h4 have extension parts that extend longer than other parallel portions h to the orthogonal axis P by a predetermined length of m2, respectively.

The first hinge structure 12X with the above-mentioned composition, as shown in FIG. 4, has a symmetric shape with respect to the center Px. Such design allows the first hinge structure 12X to have a wide range of tilt angle and high strength.

Hereinabove, the first hinge structure 12X has been explained. In addition, the second hinge structure 12Y has the same composition as the first hinge structure 12X. However, it is noted that the second hinge structure 12Y is primarily different in points that the center Py is located on the Y axis and the parallel portions h are parallel to the Y axis.

Figure 6A:
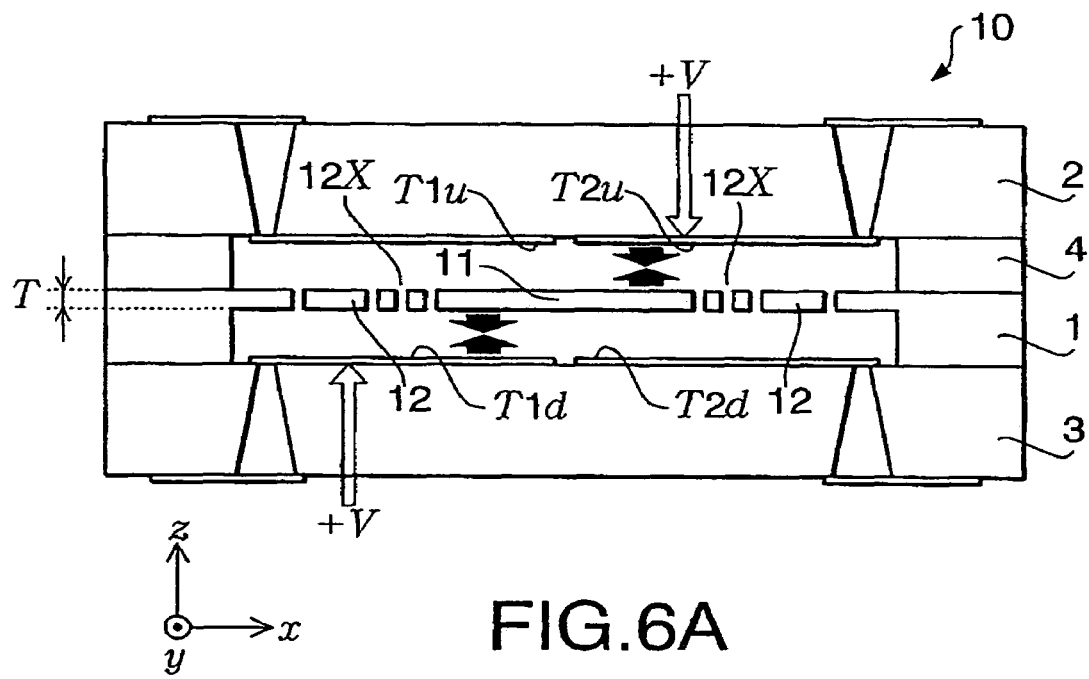
FIGS. 6A and 6B are cross-sectional views explaining the principle of operation of the micromirror device.
Figure 6B:
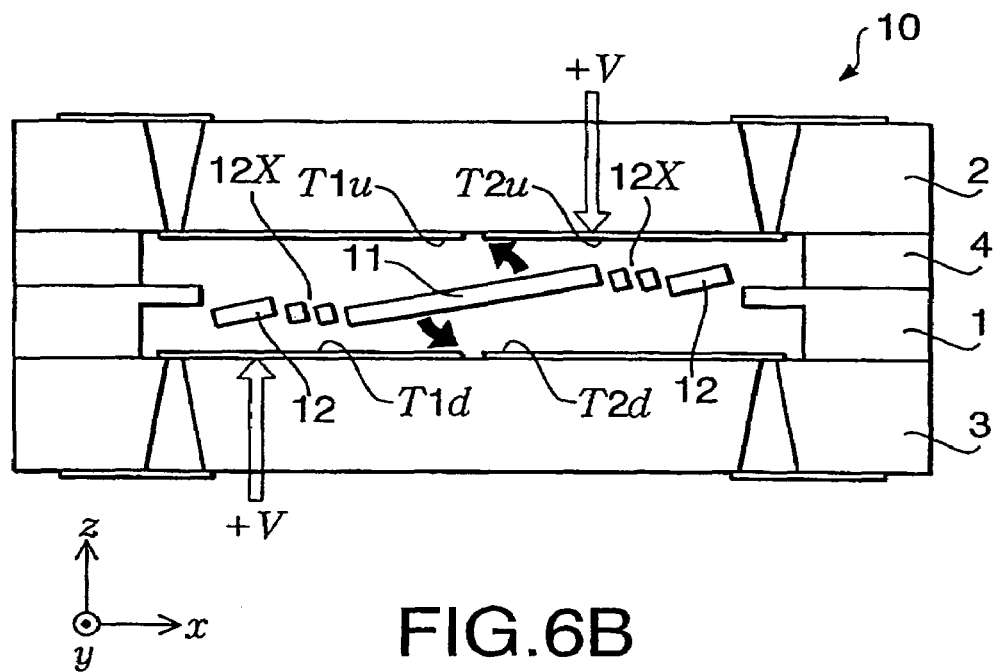

In a peripheral part of the outer frame 13 facing the lower substrate 3, a convex part (protruding downward by a prescribed level difference compared with the central part of the mirror layer 1 where the mirror surface 11 is placed) is formed (see FIGS. 6A and 6B). The convex part is provided to the outer frame 13 in order to secure a prescribed space (hereinafter referred to as a "lower space") between the mirror surface 11 and the lower substrate 3.

The mirror layer 1 configured as above is manufactured by processing an SOI (Silicon On Insulator) wafer by dry etching like RIE (Reactive Ion Etching) or various wet etching techniques. The SOI wafer is composed of three layers: an active or device layer (Si), a box layer (SiO2) and a handle layer (Si). By vapor-depositing a metal layer (Al, Au, etc.) or dielectric multiple layers on the surface of the active layer processed as shown in FIG. 3 by RIE, the mirror layer 1 including the mirror surface 11 of high reflectivity is obtained.

Figure 5C:
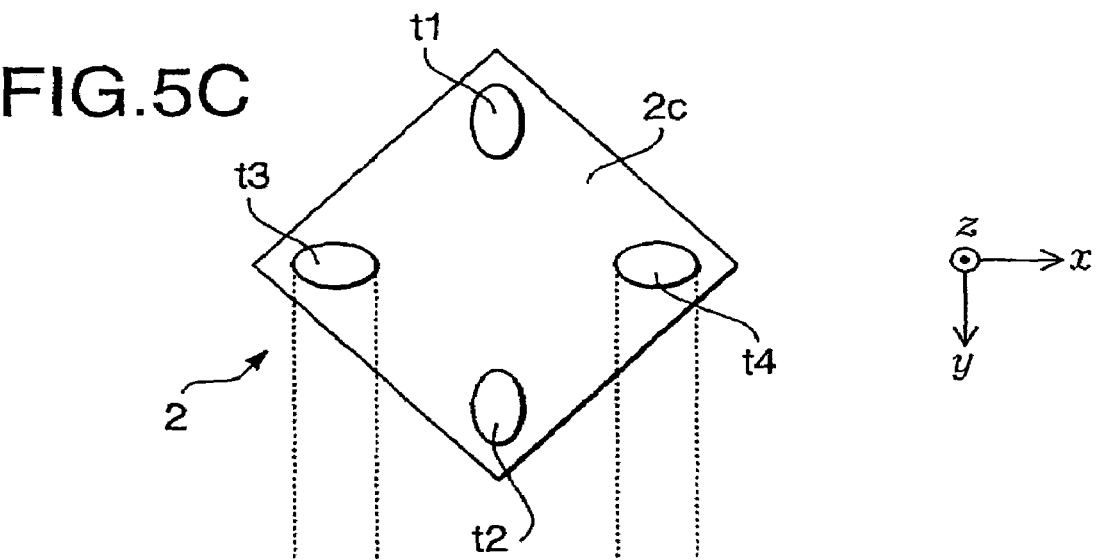
FIG. 5C is a top view of the upper substrate seen from its light incident side.
Figure 5A:
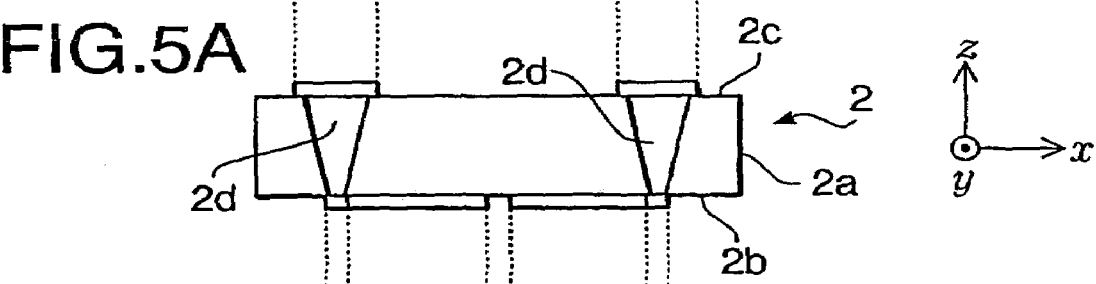
FIG. 5A is a cross-sectional view of an upper substrate of the micromirror device shown in FIG. 2 taken along the line A-A (diagonal line)
Figure 5B:
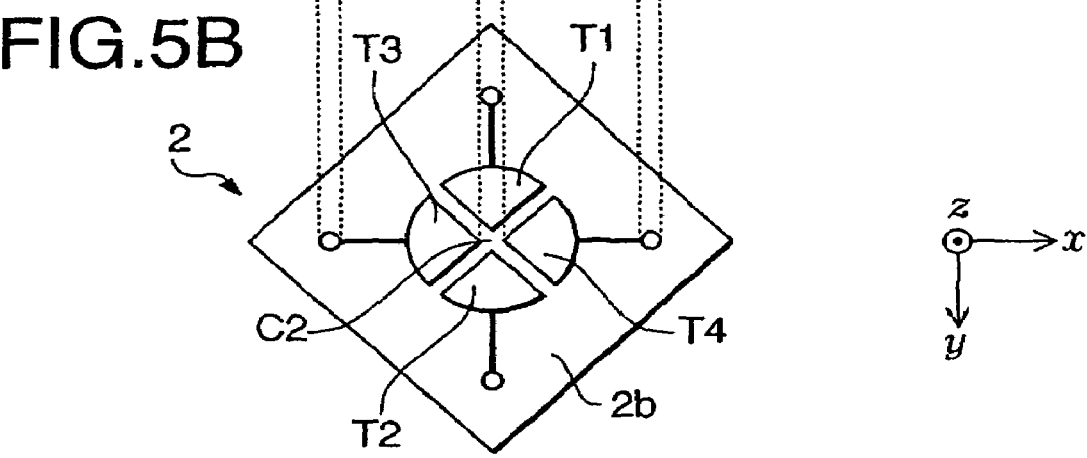
FIG. 5B is a bottom view of the upper substrate seen from the mirror layer's side.

Next, the upper substrate 2 will be explained referring to FIGS. 5A through 5C. FIG. 5A is a cross-sectional view of the upper substrate 2 shown in FIG. 2 taken along the line A-A (diagonal line). FIG. 5B is a bottom view of the upper substrate 2 seen from the mirror layer's side. FIG. 5C is a top view of the upper substrate 2 seen from its light incident side.

The upper substrate 2 is prepared by processing a glass substrate 2a having sufficient transparency allowing a beam led from outside to be incident upon the mirror surface 11. As shown in FIGS. 5A and 5B, first through fourth drive electrodes T1-T4 are formed on a plane surface 2b of the upper substrate 2 facing the mirror layer 1. Each drive electrode T1-T4 is formed as a transparent electrode like an ITO (Indium-Tin-Oxide) film so as not to block the incidence of the beam upon the mirror surface 11. The drive electrodes T1-T4 are shaped into sector forms of the same size. Specifically, first and second drive electrodes T1 and T2 are placed to be symmetrical with each other with respect to a boundary passing through the center C2 of the upper substrate 2 and stretching in the y direction (corresponding to the Y axis of the mirror layer 1). Third and fourth drive electrodes T3 and T4 are placed to be symmetrical with each other with respect to a boundary passing through the center C2 and stretching in the x direction (corresponding to the X axis of the mirror layer 1). As shown in FIGS. 5A and 5C, on a surface 2c of the upper substrate 2 opposite to the surface 2b facing the mirror layer 1, first through fourth wiring electrodes t1-t4 are formed so that voltage supplied from the outside of the micromirror device 10 can be applied to the drive electrodes T1-T4.

The glass substrate 2a is also provided with conducting parts 2d for electrically connecting the wiring electrodes t1-t4 to the drive electrodes T1-T4 respectively. Each conducting part 2d is formed by opening a through hole through the glass substrate 2a by sand blasting, etc. and filling the through hole with a conductive material. The formation of the conducting parts 2d (through holes) by sand blasting is only an example, and thus other techniques can also be used as long as the conducting parts 2d (through holes) can be formed. By the above composition, voltage supplied from the outside of the micromirror device 10 can be applied to the drive electrodes T1-T4 via the conducting parts 2d.

The lower substrate 3 in this embodiment is configured the same as the upper substrate 2 which has been described above. By the common use of the same substrate configuration for the upper and lower substrates 2 and 3, costs can be reduced and efficiency of assembly work can be increased. Further, among the electrodes facing one another via the mirror layer 1 (mirror surface 11), those placed diagonally with respect to the X axis or the Y axis are in symmetrical relationship with each other with respect to the center C1 of the mirror surface 11. Therefore, substantially the same electrostatic force occurs irrespective of which electrode is supplied with a subscribed level of voltage.

The spacer 4 is provided in order to secure a prescribed space (hereinafter referred to as an "upper space") between the upper substrate 2 and the mirror layer 1 (mirror surface 11). Specifically, the spacer 4 is made of silicon to have substantially the same height as the aforementioned convex part of the mirror layer 1. In other words, in the micromirror device 10 of this embodiment, the upper space secured by the spacer 4 has substantially the same height as the lower space secured by the convex part. Therefore, electrostatic force applied to the mirror surface 11 when a certain voltage is applied to an electrode becomes substantially the same regardless of the electrode, and thus no displacement of the mirror surface 11 occurs even when bias voltage is applied to every electrode.

In the stacking of the components 1-4, various well-known joining techniques can be used. In this embodiment, the components 1-4 are joined together by anode junction. Since the spacer 4 and the mirror layer 1 (both made of silicon) can not be joined directly by anode junction, a thin glass layer is placed between the spacer 4 and the mirror layer 1 and the two layers are joined together by anode junction via the glass layer. Incidentally, an error in the height of the upper space caused by the glass layer has no effect in practical use since the glass layer is far thinner than each component 1-4.

In cases where the components 1-4 are vacuum-packaged in the last step of the manufacturing process of the micromirror device 10, the use of a spacer 4 made of Pyrex (registered trademark) glass is desirable. Parts that can not be joined together by anode junction may also be joined by use of polyimide adhesives like Photoneece (registered trademark).

The principle of operation of the micromirror device 10 configured as above will be explained below referring to FIGS. 6A and 6B. FIG. 6A shows the status of the micromirror device 10 before the application of voltage to drive electrodes and FIG. 6B shows the status of the micromirror device 10 with a prescribed voltage applied to drive electrodes. In FIGS. 6A and 6B, for discriminating between the drive electrodes T1-T4 provided to the upper substrate 2 and those provided to the lower substrate 3, drive electrodes of the upper substrate 2 are referred to as "upper drive electrodes T1*u*-T4*u*" while those of the lower substrate 3 are referred to as "lower drive electrodes T1*d*-T4*d*" for the sake of convenience.

To rotate the mirror surface 11 around the Y axis, a prescribed voltage (+V) is applied to a lower drive electrode T1*d* and an upper drive electrodes T2*u* as shown in FIG. 6A. By the application of the voltage, electrostatic force (attraction) is caused between the mirror surface 11 and each drive electrode T1*d*, T2*u* as indicated by solidly shaded arrows in FIG. 6A, by which the mirror surface 11 and the frame 12 rotate around the Y axis formed by a pair of second hinge structures 12Y (see FIG. 2) as shown in FIG. 6B. To rotate the mirror surface 11 around the Y axis in a direction opposite to FIG. 6B, the prescribed voltage (+V) is applied to a lower drive electrode T2*d* and an upper drive electrodes T1*u*.

As above, the micromirror device 10 of this embodiment rotates the mirror surface 11 (and the frame 12) around the Y axis by simultaneously applying the same voltage to a pair of drive electrodes T1*d* and T2*u* or a pair of drive electrodes T2*d* and T1*u* which are placed diagonally with respect to the Y axis. Each electrostatic force caused by the application of voltage is applied to the mirror surface 11 substantially as a pure bending moment (rotation moment), as indicated by solidly shaded arrows in FIG. 6B. Therefore, the load on the second hinge structures 12Y and the mirror surface 11 caused by the mirror rotation can be reduced compared to conventional configurations.

Further, by the provision of the drive electrodes to both the upper substrate 2 and the lower substrate 3, a large electrode area can be achieved for the mirror rotation. Moreover, sufficient spaces (upper space, lower space) are secured by the spacer 4 and the convex part of the mirror layer 1. Therefore, the micromirror device 10 of this embodiment can ensure a large tilt angle even if the voltage applied to each electrode is reduced to a low level.

The above is the principle of operation of the micromirror device 10. Incidentally, while only the rotation of the mirror surface 11 around the Y axis has been described above, the rotation of the mirror surface 11 around the X axis is also implemented by substantially the same principle, except for the following points. In the rotation around the X axis, the voltage is applied to a pair of drive electrodes (an upper drive electrode T3*u* and a lower drive electrode T4*d*, or an upper drive electrode T4*u* and a lower drive electrode T3*d*) which are placed diagonally with respect to the X axis. Since the first hinge structures 12X serve as the rotation axis, the frame 12 does not rotate in this case.

In the following, the performance of the micromirror device 10 employing the hinge structures 12X and 12Y of this embodiment is compared with that of a micromirror device (comparative example) employing hinge structures each of which is formed by alternately folding a spring member satisfying the aforementioned conditions (1) and (2) in directions orthogonal to an axis. In the comparison, each performance has been obtained by calculation employing the finite element method. In general, hinge structure (and a micromirror device provided with the hinge structure) is designed to provide good performance mainly in the following four properties: durability and flexibility of the hinge structure when a mirror surface is tilted; deflection of the hinge structure toward electrodes while applying voltage including bias voltage to the electrodes; and relationship between respective resonance frequencies with respect to different rotation axes.

In addition, in the case of such a micromirror device 10 as the mirror layer 1 is sandwiched between the upper and lower substrates 2 and 3, the above-mentioned structure of the device 10 increases the above four properties as well as the hinge structure itself. However, it is noted that the hinge structure of this embodiment is not applied only to such a micromirror device 10 as to have the above composition. The hinge structure of this embodiment can preferably be applied to a conventional micromirror device consisting of a mirror layer and a single substrate with electrodes. For the sake of clearly showing high performance of the hinge structure itself of this embodiment, in the following comparison, assumed is a case where either of the hinge structures of this embodiment and a comparative example is employed for a generally-known micromirror device consisting of a mirror layer and a single substrate with electrodes. Hereinafter, the comparison between the present invention and the comparative example will be described every one of the above-mentioned four properties.

(Durability of the hinge structure when the mirror surface is tilted)

Figure 7A:
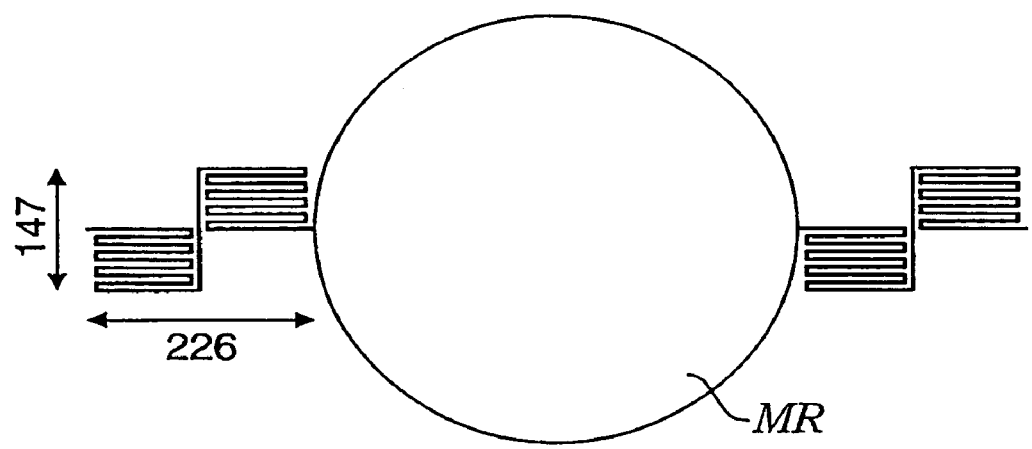
FIG. 7A is a top view of the hinge structure of the first embodiment with optimized dimensions.
Figure 7B:
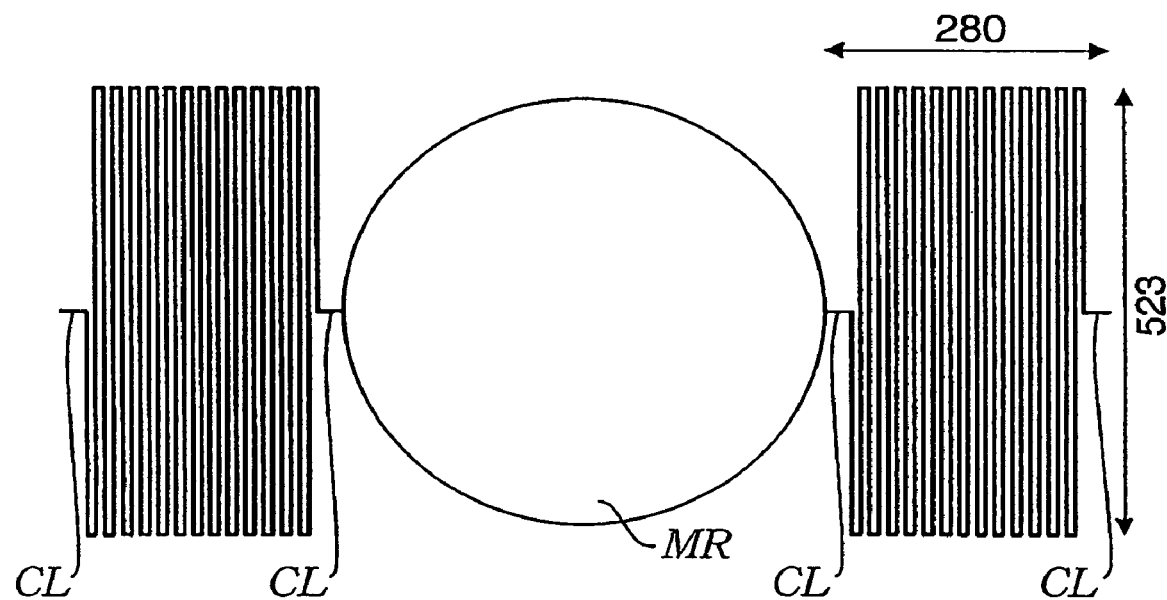
FIG. 7B is a top view of a hinge structure of a comparative example with optimized dimensions.

The durability of the hinge structure will be studied by comparing the hinge structure according to this embodiment with that of the comparative example, both the hinge structures being optimally designed to minimize deflection amounts toward the respective electrodes. FIGS. 7A and 7B show optimized dimensions of the hinge structure of this embodiment (vertical dimension (y direction): 147 μm, horizontal dimension (x direction): 226 μm), and optimized dimensions of the hinge structure of the comparative example (vertical dimension: 523 μm, horizontal dimension: 280 μm), respectively. As shown in FIGS. 7A and 7B, when the deflection amounts of both the hinge structures toward the electrodes are optimally designed to be substantially equal, the hinge structure of this embodiment is considerably downsized, while the hinge structure of the comparative example is large. It is noted that a circular mirror surface MR in each figure is designed to have a diameter of 500 μm. In addition, for convenience of explanation, the hinge structure with respect to only one axis is shown in each of FIGS. 7A and 7B.

When the mirror surface is tilted around the rotation axis by 7.5°, the maximum internal stress of the hinge structure of this embodiment shown in FIG. 7A is detected to be 43 MPa, and that of the comparative example shown in FIG. 7B is detected to be 33 MPa. Focusing attention on the internal stress in this way, the hinge structure of the comparative example seems to have fewer loads to be applied during the operation of tilting the mirror surface. However, in the hinge structure of this embodiment, the internal stress is substantially uniformly generated substantially all over the structure, while, in the hinge structure of the comparative example, since the internal stress is generated locally at each center portion CL linking the rotatable surface (mirror surface MR) or non-rotatable surface with the hinge structure itself, the hinge structure can be easily damaged. In other words, the hinge structure of this embodiment has higher durability.

Additionally, when the hinge structure is fabricated by various kinds of etching as described above, folded parts and joint parts of each of the folded spring structures K1-K4 have the same condition as if their edges are planed by etching. The hinge structure with such planed edges enables to avoid stress concentration at the folded parts and increase the durability.

(Flexibility of the hinge structure when the mirror surface is tilted)

Figure 8:
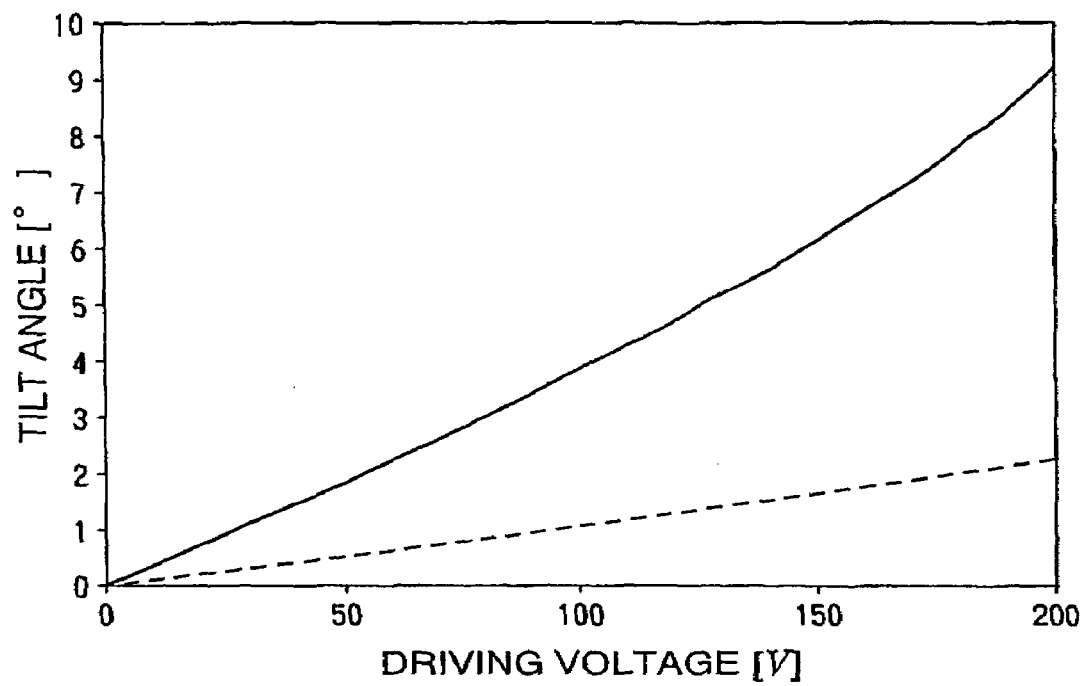
FIG. 8 is a graph showing the relationship between the tilt angle of a mirror surface and the driving voltage in each of both cases using the hinge structure of the first embodiment and the hinge structure of the comparative example that has the same dimensions as the hinge structure of the first embodiment.

FIG. 8 shows the relationship between the tilt angle of the mirror surface MR and the driving voltage in each of both cases using the hinge structure of this embodiment shown in FIG. 7A and the hinge structure of the comparative example that has the same shape as shown in FIG. 7B and the same dimensions as the hinge structure of this embodiment. In FIG. 8, the horizontal axis represents the driving voltage (unit: V), and the vertical axis represents the tilt angle of the mirror surface MR (unit: °). Moreover, in FIG. 8, the solid line and dashed line indicate the properties in the cases employing both hinge structures of this embodiment and the comparative example, respectively. The way to use both kinds of lines is the same in FIG. 9. As shown in FIG. 8, far larger tilt angle is obtained at predetermined voltage when the hinge structure of this embodiment is employed than when the hinge structure of the comparative example is employed. Calculating the tilt angles per voltage based on the graph shown in FIG. 8, they are estimated to be approximately 0.04°/V in this embodiment and 0.01°/V in the comparative example, respectively.

Figure 9:
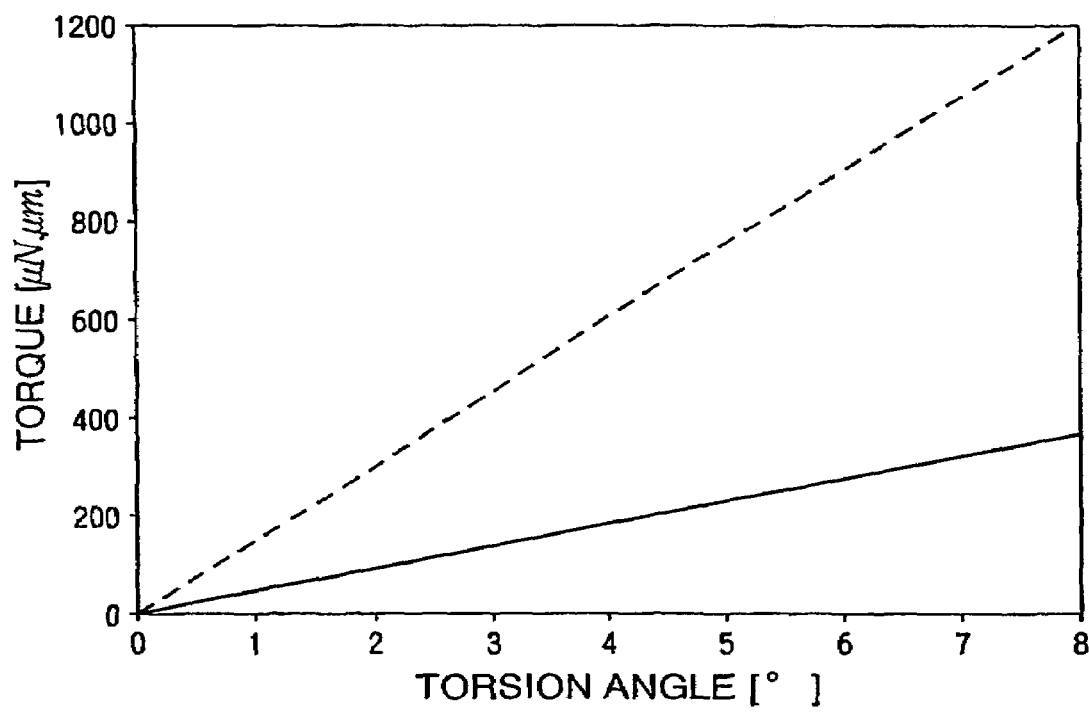
FIG. 9 is a graph showing the relationship between the torsion angle (that is, the tilt angle of the mirror surface) and the torque in each of both cases of the first embodiment and the comparative example when the hinge structures of the first embodiment and the comparative example are configured to have the same dimensions.

FIG. 9 shows the relationship between the torsion angle (that is, the tilt angle of the mirror surface MR, unit: °) and the torque (unit: μN·μm) in each of both cases of this embodiment and the comparative example when the hinge structures of this embodiment and the comparative example are configured to have the same dimensions. As shown in FIG. 9, a predetermined torsion angle is obtained at lower torque in this embodiment than in the comparative example. Calculating the spring constants based on the graph shown in FIG. 9, they are estimated to be approximately 46 μN·μm/° in this embodiment and 151 μN·μm/° in the comparative example, respectively, the spring constant of the comparative example being three times larger than that of this embodiment. The above two properties (see FIGS. 8 and 9) prove that the hinge structure of this embodiment is much more flexible than that of the comparative example.

(Deflection of the hinge structure toward the electrodes while applying voltage including bias voltage to the electrodes)

Figure 10:
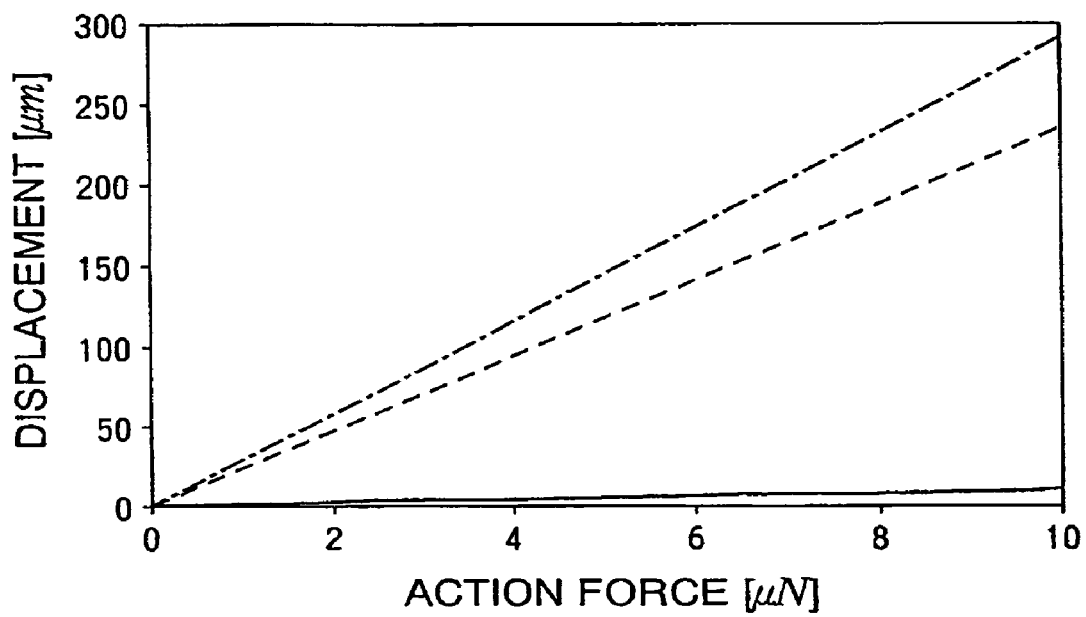
FIG. 10 is a graph showing the relationship between the action force against each hinge structure toward electrodes and the displacement of each hinge structure toward the electrodes.

Next, referring to FIG. 10, the comparative study will be made regarding the difference between the deflections of both hinge structures of this embodiment and the comparative example toward the electrodes. FIG. 10 shows the relationship between the action force against each hinge structure toward the electrodes and the displacement of each hinge structure toward the electrodes. In FIG. 10, the horizontal axis represents the action force (unit: μN), and the vertical axis represents the displacement (unit: μm). In addition, in FIG. 10, the solid line, dashed line, and alternate long and short dash line indicate properties in the cases using the hinge structure of this embodiment shown in FIG. 7A, that of the comparative example shown in FIG. 7B, and that of another comparative example which is optimally designed such that the ratio of the vertical dimension to the horizontal dimension of the hinge structure is approximately 1:1 (vertical: 359 μm, horizontal: 360 μm), respectively.

Calculating the necessary action forces for gaining 1 m displacement based on the graph shown in FIG. 10, they are estimated to be 0.958 N/m in this embodiment, 0.042 N/m in the comparative example shown in FIG. 7B, and 0.034 N/m in the other comparative example, respectively. Thus, the hinge structure of this embodiment needs a larger action force to gain a predetermined displacement toward the electrodes. Therefore, the deflection of the hinge structure of this embodiment is smaller than each of the comparative examples.

Figure 11:
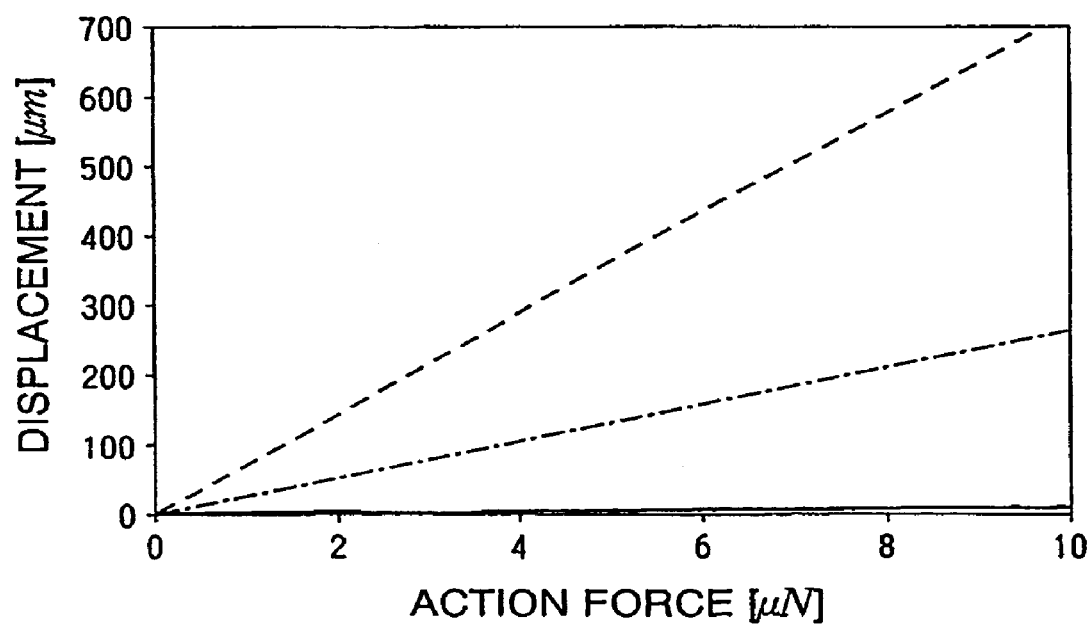
FIG. 11 is a graph showing the relationship between the action force against each hinge structure of the first embodiment, a reference example 1, and a reference example 2 toward the electrodes and the displacement of each hinge structure toward the electrodes.

Additionally, FIG. 11 shows the relationship between the action force against each hinge structure of this embodiment, a reference example 1, and a reference example 2 toward the electrodes and the displacement of each hinge structure toward the electrodes. The hinge structure of the reference example 1 is configured to have the same vertical dimension (147 μm) as that of this embodiment and a structure that needs the same torque as the hinge structure of this embodiment to obtain predetermined torsion (horizontal dimension: 676 μm, number of folding times: 35 times). The hinge structure of the reference example 2 is configured to have the same horizontal dimension (226 μm) as that of this embodiment and a structure that needs the same torque as the hinge structure of this embodiment to obtain predetermined torsion (vertical dimension: 703 μm, number of folding times: 10 times). In FIG. 11, properties for the hinge structures of this embodiment, and the reference examples 1 and 2 are indicated by the solid line, the dashed line, and the alternate long and short dash line, respectively. Based on the graph shown in FIG. 11, the necessary action forces for gaining 1 m displacement are calculated to be 0.014 N/m in the reference example 1, and 0.038 N/m in the reference example 2. Thus, the hinge structure of this embodiment needs a larger action force to gain a predetermined displacement toward the electrodes. Therefore, the deflection of the hinge structure of this embodiment is smaller than each of the reference examples.

Additionally, in FIGS. 10 and 11, the displacement more than 50 μm is also shown consistently as calculated results. However, in the actual micromirror device, if the displacement more than about 30 μm toward the electrodes is generated, it will be much more probable that failures such as a so-called pull-in phenomenon and a breakdown of the hinge structure. Therefore, since the displacement generated in each of the comparative example shown in FIG. 7B and the reference examples is too large, the hinge structure of each example are impractical. On the contrary, the hinge structure of this embodiment has excellent performance that enables to avoid such failures.

(Relationship between respective resonance frequencies with respect to different rotation axes)

Figure 12A:
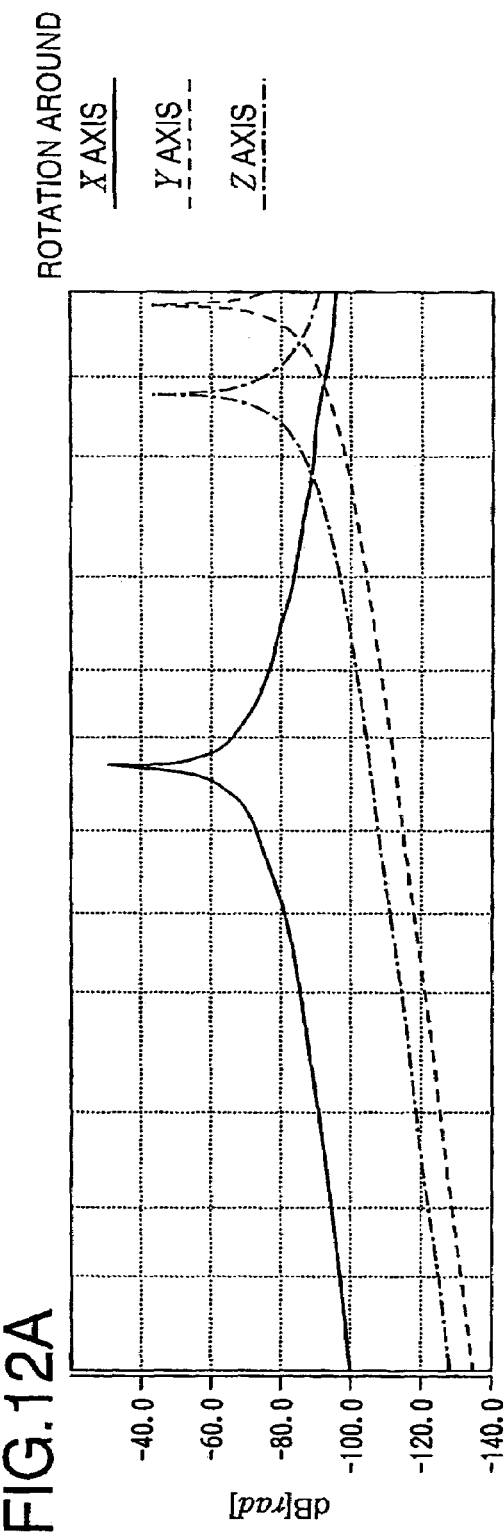
FIGS. 12A and 12B show frequency response functions for the hinge structure of the first embodiment.
Figure 12B:
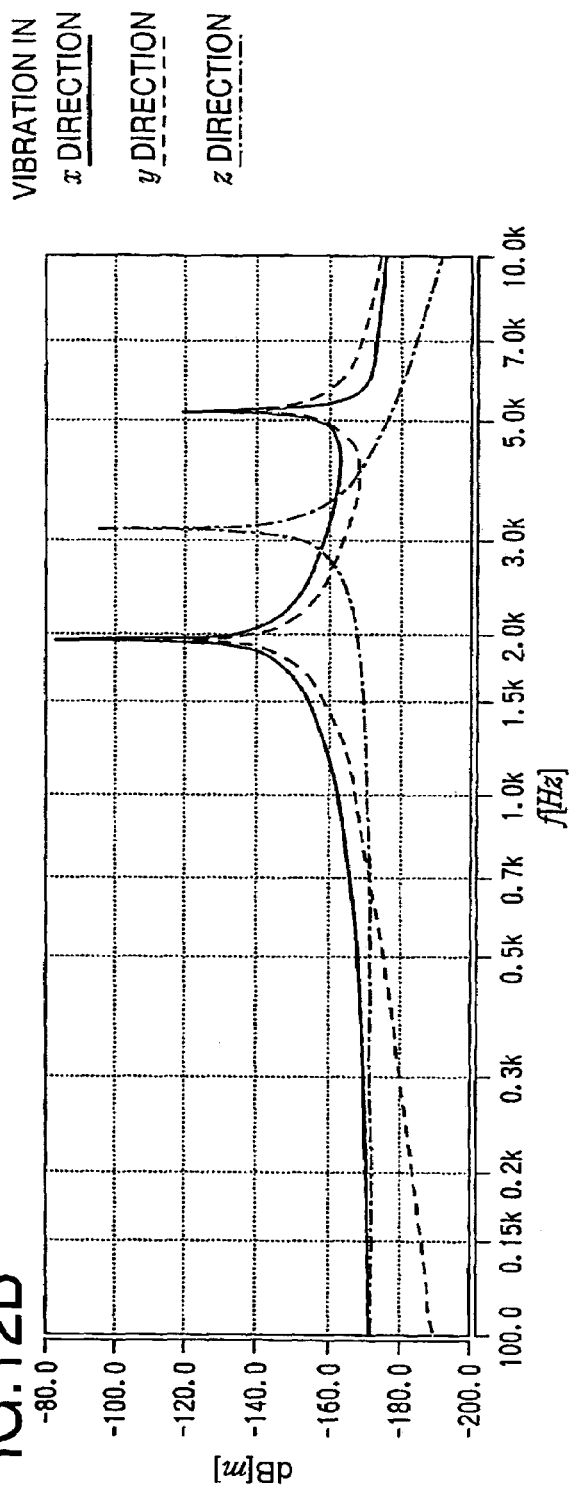

FIGS. 12A and 12B show frequency response functions for the hinge structure of this embodiment. FIGS. 13A and 13B show frequency response functions for the hinge structure of the comparative example shown in FIG. 7B. In each of FIGS. 12A and 13A, the solid line, the dashed line, and the alternate long and short dash line indicate the frequency response functions for rotation around the X axis, rotation around the Y axis, and rotation around the Z axis that is perpendicular to the X and Y axes, respectively. In each of FIGS. 12B and 13B, the solid line, the dashed line, and the alternate long and short dash line indicate the frequency response functions for vibration in the x direction, vibration in the y direction, and vibration in the z direction, respectively. It is noted that in each figure, the horizontal axis represents the frequency (Hz), and the vertical axis represents the gain, that is, the angle (rad) in FIGS. 12A and 13A, and the displacement (m) in FIGS. 12B and 13B.

As shown in FIGS. 13A and 13B, in the frequency response functions for the hinge structure of the comparative example, the resonance frequencies of the rotations around the X, Y, and Z axes and the vibrations in the x, y, and z directions (especially, in the y and z directions) are concentrated in a specific range. In other words, when the mirror surface MR supported by the hinge structure of the comparative example is rotated around the X or Y axes, the rotations around other axes and the vibrations in the x, y, and z directions are induced as well. Especially, when a micromirror device, which is required to finely and precisely drive a mirror surface, is driven to rotate the mirror surface around a specific axis, the driving frequency is controlled in a frequency range that is slightly different from the resonance frequency of the rotation around the specific axis in many cases. Therefore, when the hinge structure of the comparative example is employed, the micromirror device is unstably controlled and it is hard to finely and precisely drive the mirror surface.

On the contrary, the hinge structure of this embodiment, as shown in FIGS. 12A and 12B, has the resonance frequencies of the rotations around the X, Y, and Z axes, and the vibrations in the x, y, and z directions that are relatively scattered on the X axis compared with the comparative example. Accordingly, in the case using the hinge structure of this embodiment, there is not such a problem as caused in the comparative example. That is, the hinge structure of this embodiment enables to finely and precisely drive the mirror surface.

As a result of the above comparative study, it is clear that the hinge structures 12X and 12Y of this embodiment will show a high spring performance even if they are small in comparison with the conventional composition. Thereby, the area fraction that the hinge structures account in the mirror layer can be small. In other words, if the hinge structure of this embodiment is applied to the micromirror device, the strength of the whole mirror layer will be assured and longer operating life of the entire micromirror device will be attained.

Next, another embodiment (second embodiment) of the invention will be explained.

Figure 14:
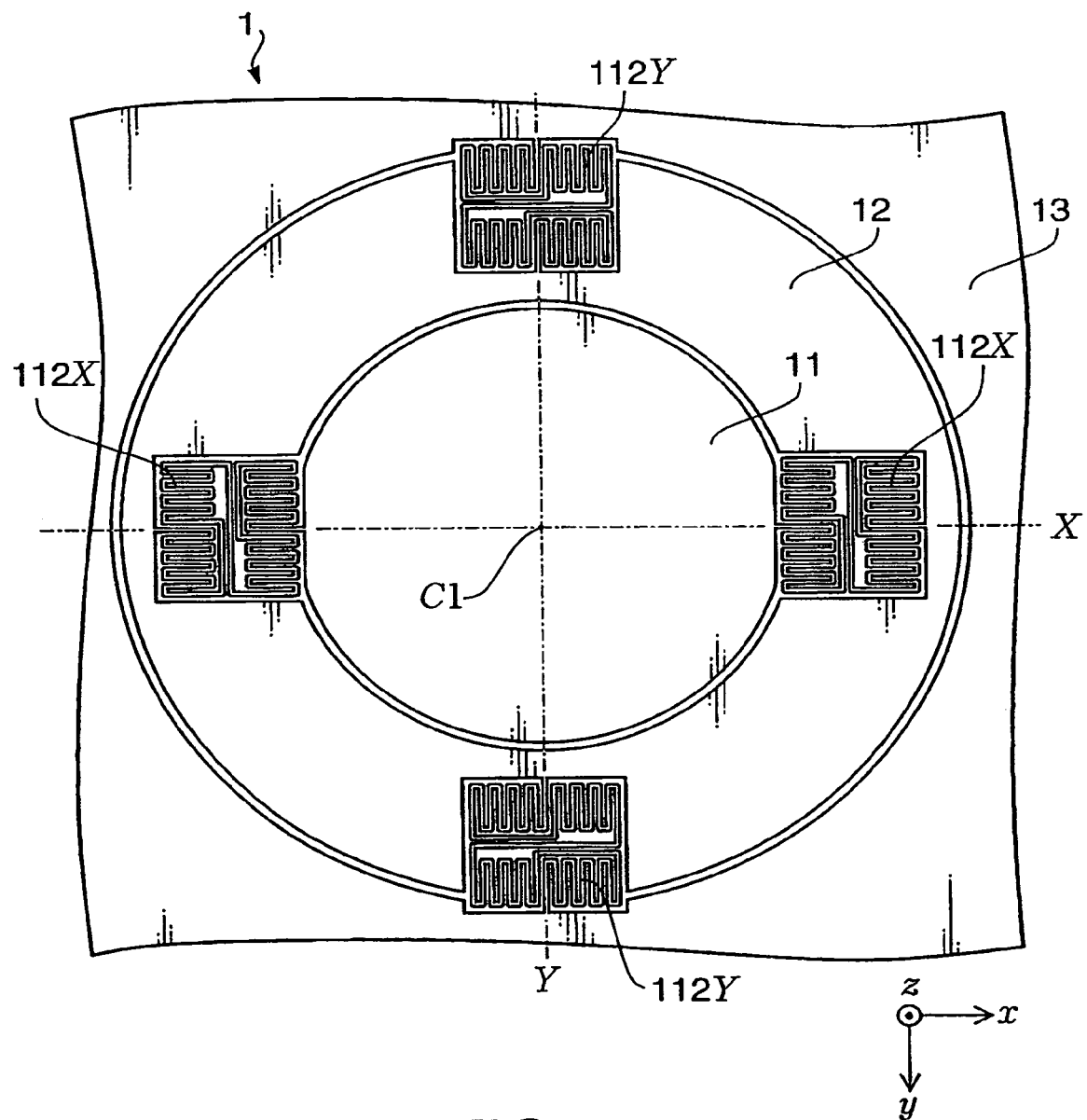
FIG. 14 is an enlarged top view showing a mirror layer of a micromirror device including a hinge structure in accordance with a second embodiment of the present invention.

FIG. 14 is an enlarged top view showing the mirror layer 1 of a micromirror device 10 according to the second embodiment of the present invention. As shown in FIG. 14, all composition except for hinge structures 112X and 112Y is the same as the first embodiment.

Figure 15:
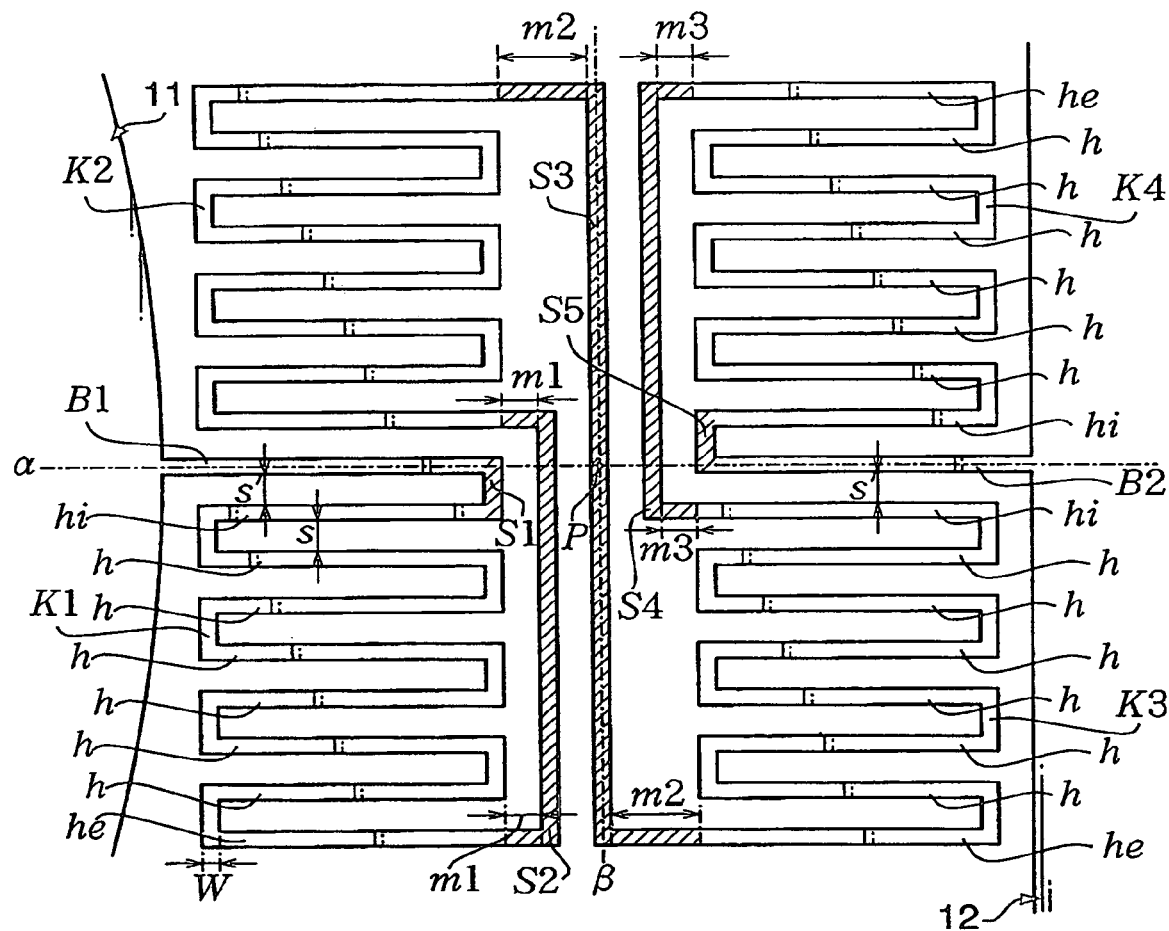
FIG. 15 is an enlarged view showing the overall composition of the hinge structure in accordance with the second embodiment.

In the following, a first hinge structure 112X will be explained in detail. FIG. 15 is an enlarged view showing the first hinge structure 112X, in which the X axis is indicated with a broken line. As shown in FIG. 15, the first hinge structure 12X is formed by bending a spring member into a prescribed geometrical shape. It is noted that in order to explain the concrete composition of the first hinge structure 112X, the same axis as the X axis in FIGS. 2 and 3 is referred to as a rotation axis α in FIG. 15 for the sake of convenience. In addition, the center point, which is located on the rotation axis α, of the linear segment extending from the joint of a mirror surface 11 with the first hinge structure 112X to the joint of a frame 12 with the first hinge structure 112X is referred to as a center of the hinge structure, which is shown as a point P in FIG. 15. Furthermore, an axis that is passing through the center P and perpendicular to the rotation axis α is referred to as an orthogonal axis β.

The spring member is configured so that its width W [μm] (see FIG. 15) and thickness T [μm] (see FIG. 6A) will satisfy the following conditions (1') and (2'), respectively:

$$2 \leq W \leq 4 \tag{1'}$$

$$7 \leq T \leq 13 \tag{2'}$$

The first hinge structure 112X of this embodiment is formed of a spring member having a width W of 3 μm and a thickness T of 10 μm. By forming the first hinge structure 112X with a spring member satisfying the conditions (1') and (2'), high spring performance of the first hinge structure 112X is achieved.

The first hinge structure 12X formed of a single spring member will be described below partitioning it into 11 parts: a first center portion B1, a second center portion B2, a first to fifth joint portions S1-S5, and a first to fourth folded spring structures K1-K4, for convenience of explanation. In FIG. 15, each of the joint portions S1-S5 is shown as a shaded pattern for the sake of clearly identifying each portion.

One end of the first center portion B1 (one end of the spring member) is connected with the rotatable mirror surface 11. Moreover, one end of the second center portion B2 (the other end of the spring member) is connected with the non-rotatable frame 12. The center portions B1 and B2 are like linear segments that have the same length, and are located on the rotation axis α. The first to fifth joint portions S1-S5 are provided to connect portions to be connected substantially perpendicularly, and have at least a part extending in a direction parallel to the orthogonal axis β.

The first and second folded spring structures K1 and K2 are located between the orthogonal axis β and the mirror surface 11. The third and fourth folded spring structures are located between the orthogonal axis β and the frame 12. The first to fourth folded spring structures K1-K4 are in substantially axisymmetric relation with each other with respect to the rotation axis α or the orthogonal axis β.

The first to fourth folded spring structures K1-K4 are formed by folding the spring member a plurality of times such that the longitudinal directions of them are substantially parallel to the rotation axis α. In each of the first to fourth folded spring structures K1-K4, portions parallel to the rotation axis α are referred to as parallel portions h. According to this embodiment, the spring member is folded substantially perpendicularly to form the first folded spring structure K1. Therefore, the parallel portions h are aligned along a parallel direction to the orthogonal axis β. All of the parallel portions h are configured to have the same length. Among the parallel portions h of the first to fourth folded spring structures K1-K4, a parallel portion that is located nearest to the rotation axis α is referred to as an inner parallel portion hi, and a parallel portion that is located farthest from the rotation axis α is referred to as an outer parallel portion he. In addition, in order to uniformly disperse stress that is generated while tilting the mirror surface 11, an interval that is formed by folding the spring member, that is, an interval s between any two parallel portions h laying side by side in the orthogonal axis β direction is the same. The interval s [μm] is designed to satisfy the following condition (3'):

$$4 \leq s \leq 8 \qquad (3')$$

Such hinge composition as to satisfy the condition (3') enables to obtain a small hinge structure with high spring performance by optimizing the spring constant with respect to torsion. In the first hinge structure 112X of this embodiment, the interval s is set to 6 μM. An interval between any two adjacent parallel portions, in the folded spring structures K1-K4, is configured to satisfy the condition (3') as well.

One end of the inner parallel portion hi of the first folded spring structure K1 is connected with one end of the first center portion B1, that is more concretely, the opposite end of the first center portion B1 to an end connected with the mirror surface 11, through the linear-segment-like first joint portion S1 parallel to the orthogonal axis β. An interval s' between the inner parallel portion hi of the first folded spring structure K1 and the first center portion B1 is configured to satisfy the condition (3'). In this embodiment, the interval s' is also designed to be the same (6 μm) as the interval s. The interval s' between the inner parallel portion hi of the fourth folded spring structure K4 and the second center portion B2 is designed in the same way.

One end of the outer parallel portion he of the first folded spring structure K1 is connected with one end of the inner parallel portion hi of the second folded spring structure K2 through the second joint portion S2. So as to avoid contact with the first folded spring structure K1, the second joint portion S2 has a shape as follows: The longitudinal direction of the second joint portion S2 is parallel to the orthogonal axis β, and the second joint portion S2 has two extensions, each of which is extending parallel to the rotation axis α from the corresponding one of both ends of the second joint portion S2 by a predetermined length of m1.

One end of the outer parallel portion he of the second folded spring structure K1 is connected with one end of the outer parallel portion he of the third folded spring structure K3 through the third joint portion S3. In order to avoid contact with the joint portions S2 and S4, and the folded spring structures K1-K4, the third joint portion S3 has a shape as follows: The third joint portion S3 has a linear-segment-like part that is located on and along the orthogonal axis β and two extensions, each of which is extending parallel to the rotation axis α from the corresponding one of both ends of the linear-segment-like part; The two extensions are extending in the respective directions opposite to one another, and each extension is configured to have a length of m2 longer than m1. In addition, the linear-segment-like part, which is located on and along the orthogonal axis β, makes it possible to favorably keep the balance and spring performance of the whole hinge structure 12X.

One end of the inner parallel portion hi of the third folded spring structure K3 is connected with one end of the outer parallel portion he of the fourth folded spring structure K4 through the fourth joint portion S4. So as to avoid contact with the fourth folded spring structure K4 and the third joint portion S3, the fourth joint portion S4 has a shape as follows: The longitudinal direction of the fourth joint portion S4 is parallel to the orthogonal axis β, and the fourth joint portion S4 has two extensions, each of which is extending parallel to the rotation axis α from the corresponding one of both ends of the fourth joint portion S4 by a predetermined length of m3. In this embodiment, the length of m3 is set the same as the length of m1 in order to preferably keep the balance and spring performance of the whole first hinge structure.

One end of the inner parallel portion hi of the fourth folded spring structure K4 is connected with one end of the second center portion B2, that is more concretely, the opposite end of the second center portion B1 to an end connected with the frame 12, through the linear-segment-like fifth joint portion S5 parallel to the orthogonal axis β.

Furthermore, a distance between the first joint portion S1 and the orthogonal axis β, and a distance between folding points at a near side to the orthogonal axis β of the first and second folded spring structures K1 and K2 and the orthogonal axis β are configured to be the same. Similarly, a distance between the fifth joint portion S5 and the orthogonal axis β, and a distance between folding points at a near side to the orthogonal axis β of the third and fourth folded spring structures K3 and K4 and the orthogonal axis β are configured to be the same. Moreover, intervals between parts of the first and second joint portions S1 and S2 that are parallel to the orthogonal axis β, between parts of the second and third joint portions S2 and S3 that are parallel to the orthogonal axis β, between parts of the third and fourth joint portions S3 and S4 that are parallel to the orthogonal axis β, and between parts of the fourth and fifth joint portions S4 and S5 that are parallel to the orthogonal axis β are configured to be the same. In this embodiment, all the intervals are set 6 μm.

Additionally, in each of the folded spring structures K1-K4, a distance between each of folding points at the side of the mirror surface 11 or the frame 12 and the orthogonal axis β is configured the same.

The first hinge structure 112X with the above-mentioned composition, as shown in FIG. 15, has a symmetric shape with respect to the center P. Such design allows the first hinge structure 112X to have a wide range of tilt angle and high strength.

Hereinabove, the first hinge structure 112X has been explained. In addition, the second hinge structure 112Y has the same composition as the first hinge structure 112X. However, it is noted that the second hinge structure 112Y is primarily different in points that the center portions B1 and B2 are arranged along the Y axis and the parallel portions h are parallel to the Y axis.

In addition, it is noted that the basic composition, fabrication method, and principle of operation of the micromirror device employing the hinge structures of the second embodiment, except for the hinge structure, are the same as those of the aforementioned first embodiment.

In the following, the performance of the micromirror device 10 employing the hinge structures 112X and 112Y of this embodiment is compared with that of a micromirror device (comparative example) employing hinge structures each of which is formed by alternately folding a spring member satisfying the aforementioned conditions (1') and (2') in directions orthogonal to an axis. In the comparison, each performance has been was obtained by calculation employing the finite element method. In general, hinge structure (and a micromirror device provided with the hinge structure) is designed to provide good performance mainly in the following four properties: durability and flexibility of the hinge structure when a mirror surface is tilted; deflection of the hinge structure toward electrodes while applying voltage including bias voltage to the electrodes; and relationship between respective resonance frequencies with respect to different rotation axes.

In addition, in the case of such a micromirror device 10 as the mirror layer 1 is sandwiched between the upper and lower substrates 2 and 3, the above-mentioned structure of the device 10 increases the above four properties as well as the hinge structure itself. However, it is noted that the hinge structure of this embodiment is not applied only to such a micromirror device 10 as to have the above composition. The hinge structure of this embodiment can preferably be applied to a conventional micromirror device consisting of a mirror layer and a single substrate with electrodes. For the sake of clearly showing high performance of the hinge structure itself of this embodiment, in the following comparison, assumed is a case where either of the hinge structures of this embodiment and a comparative example is employed for a generally-known micromirror device consisting of a mirror layer and a single substrate with electrodes. Hereinafter, the comparison between the present invention and the comparative example will be described every one of the above-mentioned four properties.

(Durability of the hinge structure when the mirror surface is tilted)

Figure 16A:
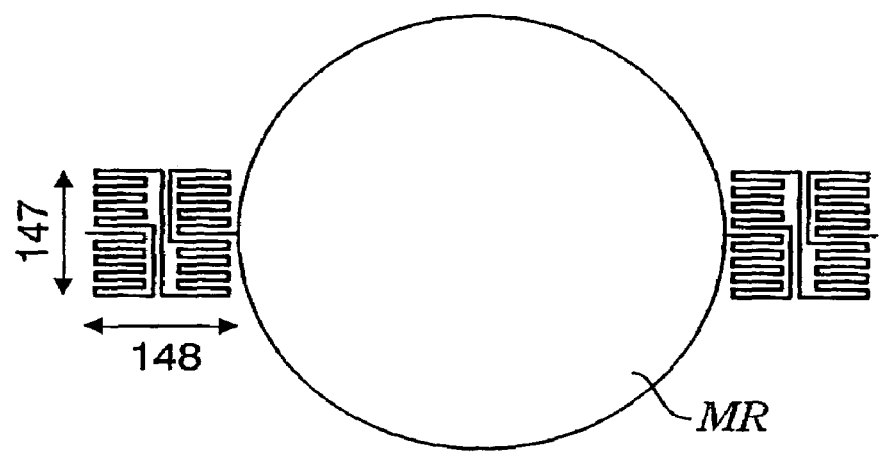
FIG. 16A is a top view of the hinge structure of the second embodiment with optimized dimensions.
Figure 16B:
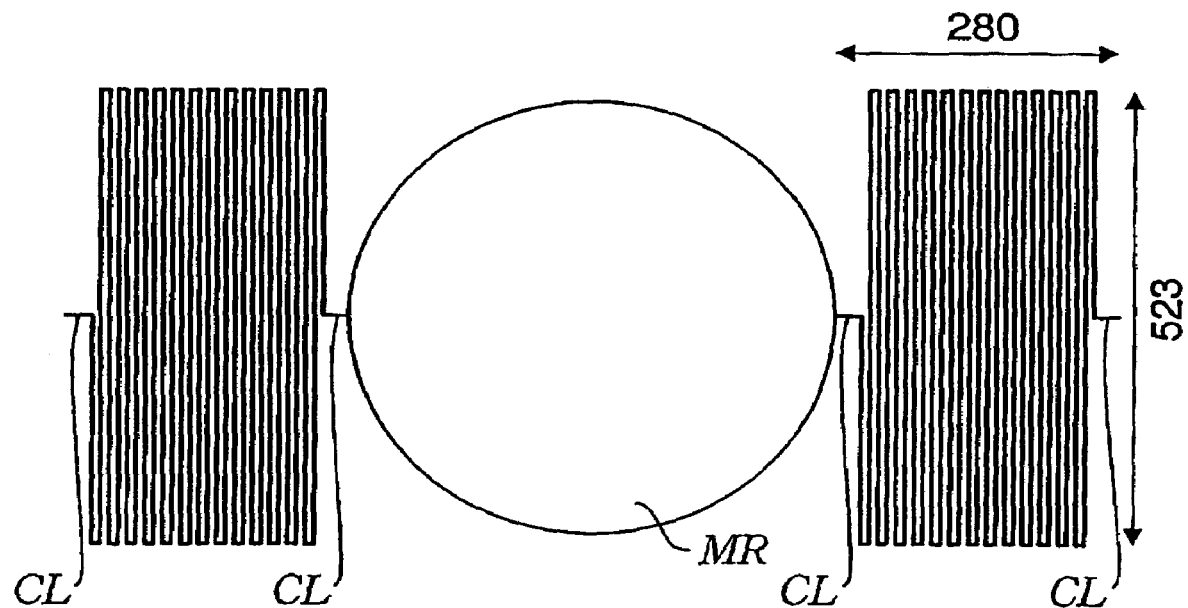
FIG. 16B is a top view of a hinge structure of a comparative example with optimized dimensions.

The durability of the hinge structure will be studied compared the hinge structure of this embodiment with that of the comparative example, both the hinge structures being optimally designed to minimize deflection amounts toward the respective electrodes. FIGS. 16A and 16B show optimized dimensions of the hinge structure of this embodiment (vertical dimension (y direction): 147 µm, horizontal dimension (x direction): 148 µm), and optimized dimensions of the hinge structure of the comparative example (vertical dimension: 523 µm horizontal dimension: 280 µm), respectively. As shown in FIGS. 16A and 16B, when the deflection amounts of both the hinge structures toward the electrodes are optimally designed to be substantially equal, the hinge structure of this embodiment is considerably downsized, while the hinge structure of the comparative example is large. It is noted that a circular mirror surface MR in each figure is designed to have a diameter of 500 µm. In addition, for convenience of explanation, the hinge structure with respect to only one axis is shown in each of FIGS. 16A and 16B.

When the mirror surface is tilted around the rotation axis by 7.5°, the maximum internal stress of the hinge structure of this embodiment shown in FIG. 16A is detected to be 38 MPa, and that of the comparative example shown in FIG. 16B is detected to be 33 MPa. Focusing attention on the internal stress in this way, the hinge structure of the comparative example seems to have fewer loads to be applied during the operation of tilting the mirror surface. However, in the hinge structure of this embodiment, the internal stress is substantially uniformly generated substantially all over the structure, while, in the hinge structure of the comparative example, since the internal stress is generated locally at each center portion CL linking the rotatable surface (mirror surface MR) or non-rotatable surface with the hinge structure itself, the hinge structure can be easily damaged. In other words, the hinge structure of this embodiment has higher durability.

Additionally, when the hinge structure is fabricated by various kinds of etching, folded parts and joint parts of each of the folded spring structures K1-K4 have the same condition as if their edges are planed by etching. The hinge structure with such planed edges makes it possible to avoid stress concentration at the folded parts and increase the durability.

(Flexibility of the hinge structure when the mirror surface is tilted)

Figure 17:
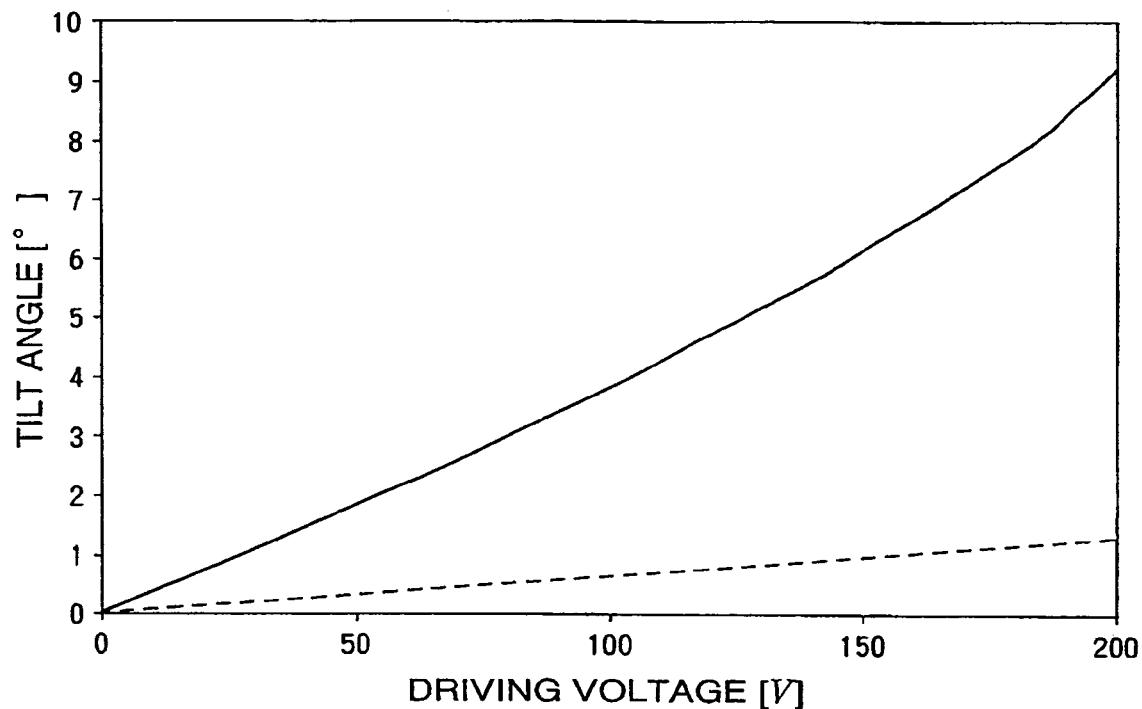
FIG. 17 is a graph showing the relationship between the tilt angle of a mirror surface and the driving voltage in each of both cases using the hinge structure of the second embodiment and the hinge structure of the comparative example that has the same dimensions as the hinge structure of the second embodiment.

FIG. 17 shows the relationship between the tilt angle of the mirror surface MR and the driving voltage in each of both cases using the hinge structure of this embodiment shown in FIG. 16A and the hinge structure of the comparative example that has the same shape as shown in FIG. 16B and the same dimensions as the hinge structure of this embodiment. In FIG. 17, the horizontal axis represents the driving voltage (unit: V), and the vertical axis represents the tilt angle of the mirror surface MR (unit: °). Moreover, in FIG. 17, the solid line and dashed line indicate the properties in the cases employing both hinge structures of this embodiment and the comparative example, respectively. The way to use both kinds of lines is the same in FIG. 18. As shown in FIG. 17, far larger tilt angle is obtained at predetermined voltage when the hinge structure of this embodiment is employed than when the hinge structure of the comparative example is employed. Calculating the tilt angles per voltage based on the graph shown in FIG. 17, they are estimated to be approximately 0.04°/V in this embodiment and 0.007°/V in the comparative example, respectively.

Figure 18:
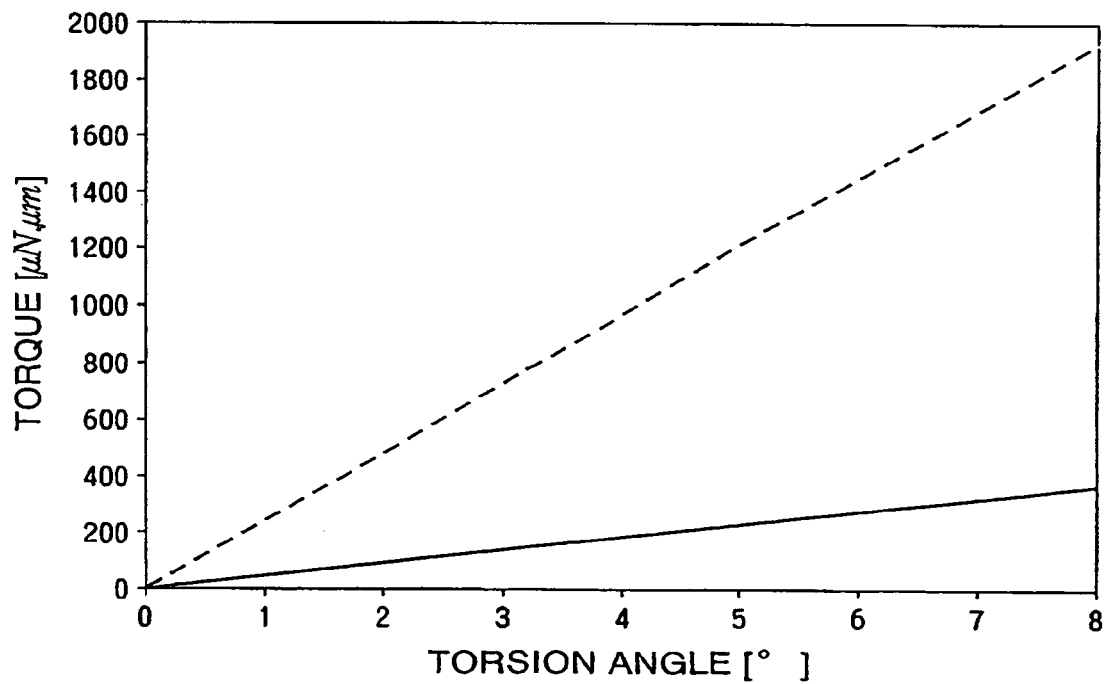
FIG. 18 is a graph showing the relationship between the torsion angle (that is, the tilt angle of the mirror surface) and the torque in each of both cases of the second embodiment and the comparative example when the hinge structures of the second embodiment and the comparative example are configured to have the same dimensions.

FIG. 18 shows the relationship between the torsion angle (that is, the tilt angle of the mirror surface MR, unit: °) and the torque (unit: µN·µm) in each of both cases of this embodiment and the comparative example when the hinge structures of this embodiment and the comparative example are configured to have the same dimensions. As shown in FIG. 18, a predetermined torsion angle is obtained at lower torque in this embodiment than in the comparative example. Calculating the spring constants based on the graph shown in FIG. 18, they are estimated to be approximately 46 µN·µm/° in this embodiment and 242 µN·µm/° in the comparative example, respectively, the spring constant of the comparative example being five times larger than that of this embodiment. The above two properties (see FIGS. 17 and 18) prove that the hinge structure of this embodiment is much more flexible than that of the comparative example.

(Deflection of the hinge structure toward the electrodes while applying voltage including bias voltage to the electrodes)

Figure 19:
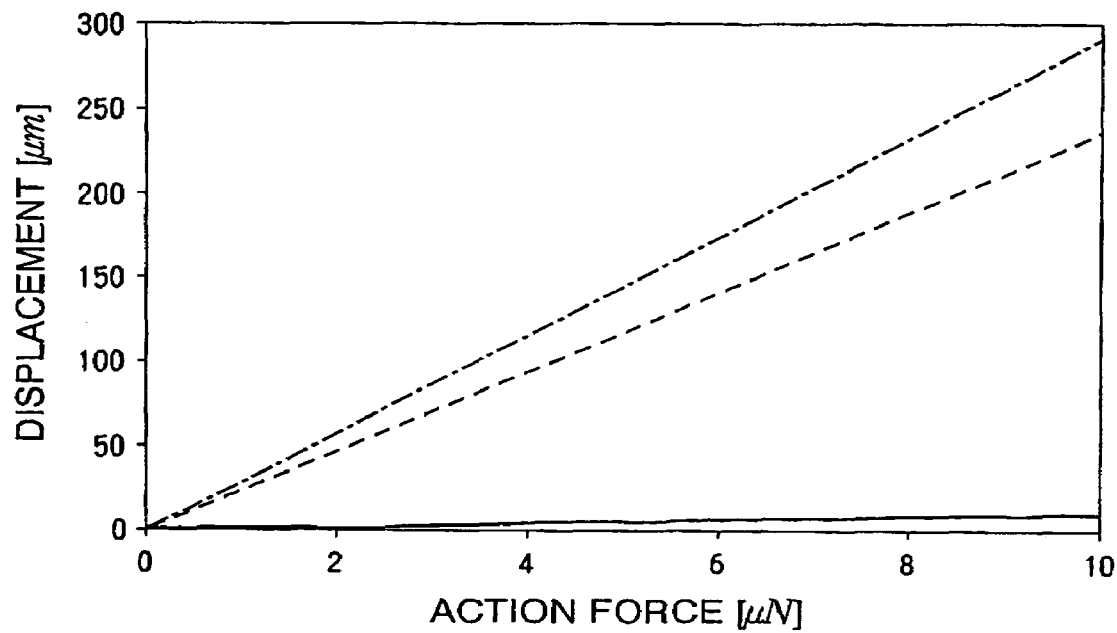
FIG. 19 is a graph showing the relationship between the action force against each hinge structure toward electrodes and the displacement of each hinge structure toward the electrodes.

Next, referring to FIG. 19, the comparative study will be made regarding the difference between the deflections of both hinge structures of this embodiment and the comparative example toward the electrodes. FIG. 19 shows the relationship between the action force against each hinge structure toward the electrodes and the displacement of each hinge structure toward the electrodes. In FIG. 19, the horizontal axis represents the action force (unit: µN), and the vertical axis represents the displacement (unit: µm). In addition, in FIG. 19, the solid line, dashed line, and alternate long and short dash line indicate properties in the cases using the hinge structure of this embodiment shown in FIG. 16A, that of the comparative example shown in FIG. 16B, and that of another comparative example which is optimally designed such that the ratio of the vertical dimension to the horizontal dimension of the hinge structure is approximately 1:1 (vertical: 359 µM, horizontal: 360 µm), respectively.

Calculating the necessary action forces for gaining 1 m displacement based on the graph shown in FIG. 19, they are estimated to be 1.018 N/m in this embodiment, 0.042 N/m in the comparative example shown in FIG. 16B, and 0.034 N/m in the other comparative example, respectively. Thus, the hinge structure of this embodiment needs a larger action force to gain a predetermined displacement toward the electrodes. Therefore, the deflection of the hinge structure of this embodiment is smaller than each of the comparative examples.

Figure 20:
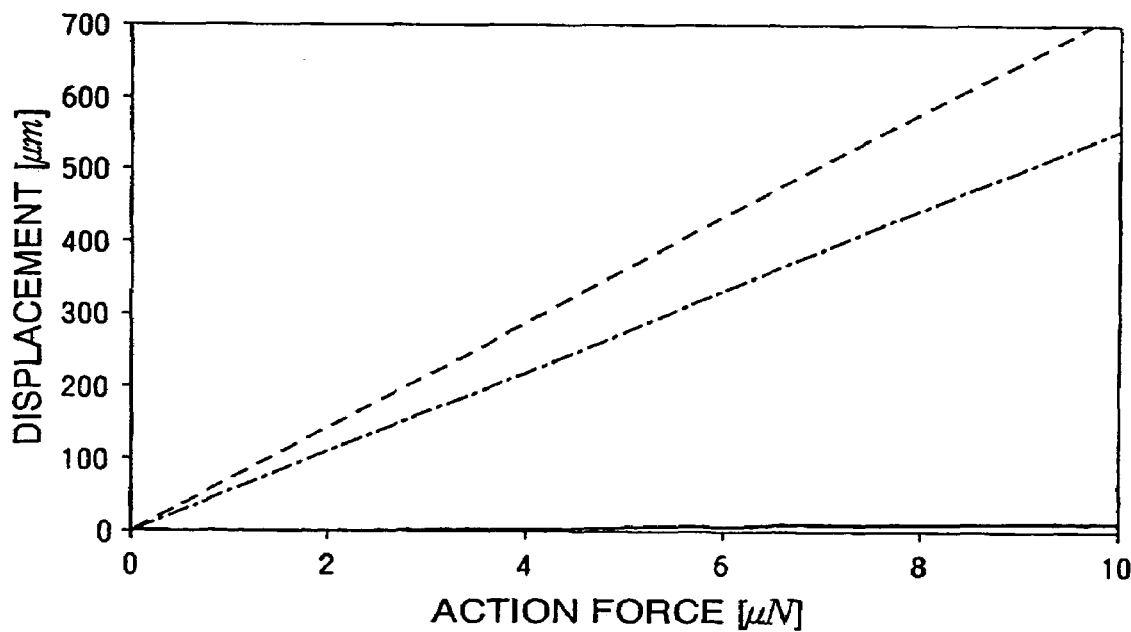
FIG. 20 is a graph showing the relationship between the action force against each hinge structure of the second embodiment, a reference example 3, and a reference example 4 toward the electrodes and the displacement of each hinge structure toward the electrodes.

Additionally, FIG. 20 shows the relationship between the action force against each hinge structure of this embodiment, a reference example 3, and a reference example 4 toward the electrodes and the displacement of each hinge structure toward the electrodes. The hinge structure of the reference example 3 is configured to have the same vertical dimension (147 µm) as that of this embodiment and a structure that needs the same torque as the hinge structure of this embodiment to obtain predetermined torsion (horizontal dimension: 676 µm, number of folding times: 35 times). The hinge structure of the reference example 4 is configured to have the same horizontal dimension (148 µm) as that of this embodiment and a structure that needs the same torque as the hinge structure of this embodiment to obtain predetermined torsion (vertical dimension: 1228 µm, number of folding times: 10 times). In FIG. 20, properties for the hinge structures of this embodiment, and the reference examples 3 and 4 are indicated by the solid line, the dashed line, and the alternate long and short dash line, respectively. Based on the graph shown in FIG. 20, the necessary action forces for gaining 1 m displacement are calculated to be 0.014 N/m in the reference example 3, and 0.018 N/m in the reference example 4. Thus, the hinge structure of this embodiment needs a larger action force to gain a predetermined displacement toward the electrodes. Therefore, the deflection of the hinge structure of this embodiment is smaller than each of the reference examples.

Additionally, in FIGS. 19 and 20, the displacement more than 50 µm is also shown consistently as calculated results. However, in the actual micromirror device, if the displacement more than about 30 µm toward the electrodes is generated, it will be much more probable that failures such as a so-called pull-in phenomenon and a breakdown of the hinge structure. Therefore, since the displacement generated in each of the comparative example shown in FIG. 16B and the reference examples is too large, the hinge structure of each example are impractical. On the contrary, the hinge structure of this embodiment has excellent performance that enables to avoid such failures.

(Relationship between respective resonance frequencies with respect to different rotation axes)

Figure 21A:
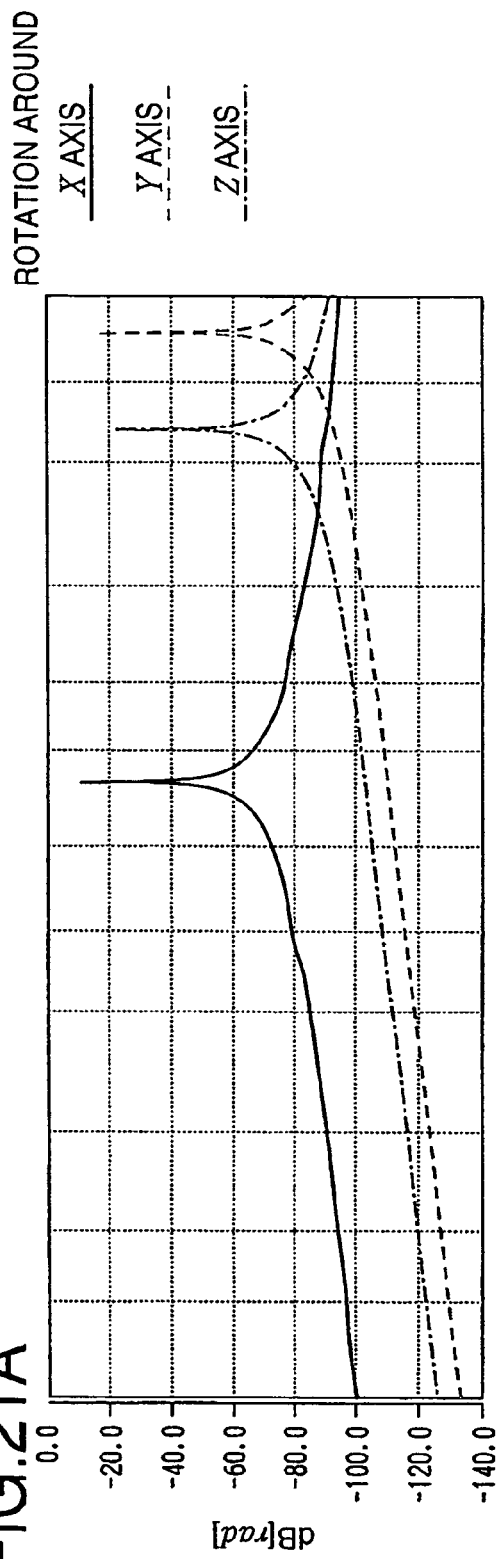
FIGS. 21A and 21B show frequency response functions for the hinge structure of the second embodiment.
Figure 21B:
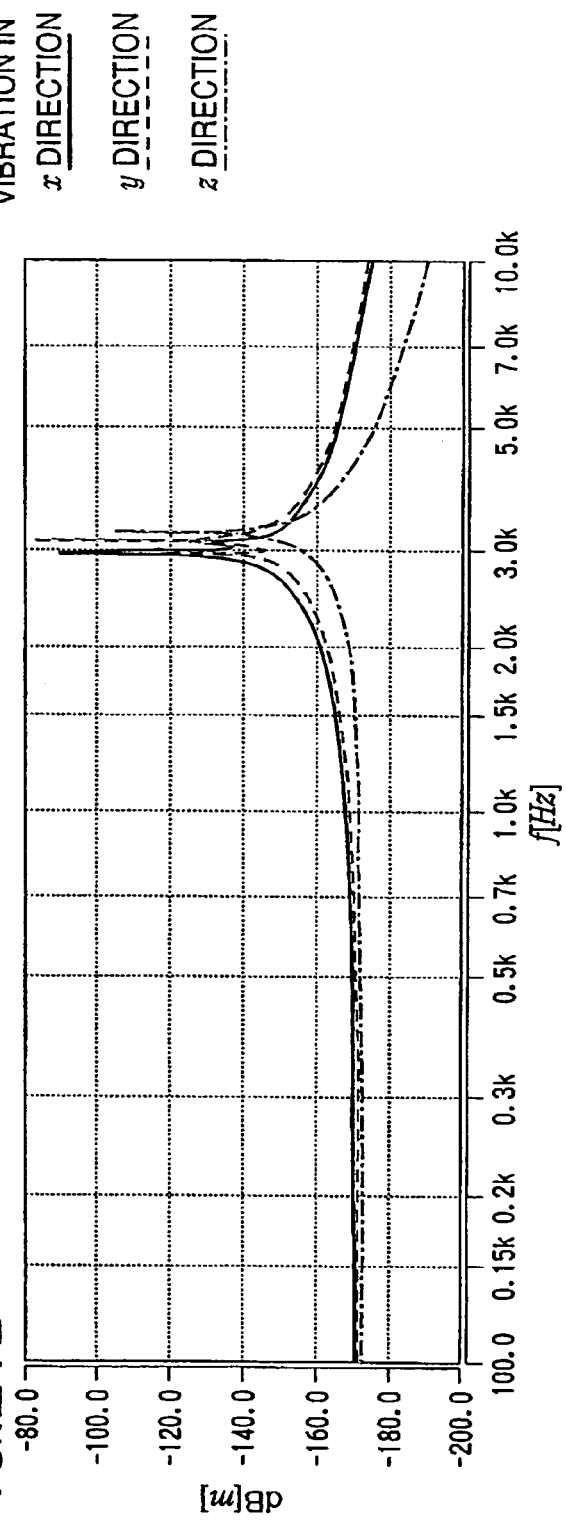

FIGS. 21 (A) and 21 (B) show frequency response functions for the hinge structure of this embodiment. FIGS. 22 (A) and 22 (B) show frequency response functions for the hinge structure of the comparative example shown in FIG. 16B. In each of FIGS. 21 (A) and 22 (A), the solid line, the dashed line, and the alternate long and short dash line indicate the frequency response functions for rotation around the X axis, rotation around the Y axis, and rotation around the Z axis that is perpendicular to the X and Y axes, respectively. In each of FIGS. 21 (B) and 22 (B), the solid line, the dashed line, and the alternate long and short dash line indicate the frequency response functions for vibration in the x direction, vibration in the y direction, and vibration in the z direction, respectively. It is noted that in each figure, the horizontal axis represents the frequency (Hz), and the vertical axis represents the gain, that is, the angle (rad) in FIGS. 21 (A) and 22 (A), and the displacement (m) in FIGS. 21 (B) and 22 (B).

As shown in FIGS. 22 (A) and 22 (B), in the frequency response functions for the hinge structure of the comparative example, the resonance frequencies of the rotations around the X, Y, and Z axes and the vibrations in the x, y, and z directions (especially, in the y and z directions) are concentrated in a specific range. In other words, when the mirror surface MR supported by the hinge structure of the comparative example is rotated around the X or Y axes, the rotations around other axes and the vibrations in the x, y, and z directions are induced as well. Especially, when a micromirror device, which is required to finely and precisely drive a mirror surface, is driven to rotate the mirror surface around a specific axis, the driving frequency is controlled in a frequency range that is slightly different from the resonance frequency of the rotation around the specific axis in many cases. Therefore, when the hinge structure of the comparative example is employed, the micromirror device is unstably controlled and it is hard to finely and precisely drive the mirror surface.

On the contrary, the hinge structure of this embodiment, as shown in FIGS. 21 (A) and 21 (B), has the resonance frequencies of the rotations around the X, Y, and Z axes, and the vibrations in the x, y, and z directions (especially, in the y and z directions) that are relatively scattered on the X axis compared with the comparative example. Accordingly, in the case using the hinge structure of this embodiment, there is not such a problem as caused in the comparative example. That is, the hinge structure of this embodiment enables to finely and precisely drive the mirror surface.

As a result of the above comparative study, it is clear that the hinge structures 12X and 112Y of this embodiment will show a high spring performance even if they are small in comparison with the conventional composition. Thereby, the area fraction that the hinge structures account in the mirror layer can be small. In other words, if the hinge structure of this embodiment is applied to the micromirror device, the strength of the whole mirror layer will be assured and longer operating life of the entire micromirror device will be attained.

Hereinabove, the embodiment according to the present invention has been explained. It is noted that the hinge structure according to the present invention is not limited by the composition shown in the above embodiment. While the hinge structure of the above embodiment is suitably employed for a micromirror device of the capacitance type, the hinge structure in accordance with the present invention is also applicable to various types of micromirror devices such as those driven by electromagnetic force, piezoelectric elements, etc.

Furthermore, it is preferable to decide the number of folding times for each folded spring structure in consideration of the balance between flexibility given to the hinge structure and the whole dimension thereof. For example, in order to obtain the same spring performance as each embodiment, it is allowable to increase the number of folding times of each folded spring structure by a plurality of times more than that of each embodiment and reduce the horizontal dimension (the length of each parallel portion).

The present disclosure relates to the subject matters contained in Japanese Patent Applications No. P2004-216679 and No. P2004-216680, filed on Jul. 26, 2004, which are expressly incorporated herein by reference in their entireties.

What is claimed is:

1. A hinge structure, comprising:
   a rotatable plate member;
   a frame member;
   a spring member that connects the rotatable plate member with the frame member at each of two opposite positions along a rotation axis so that the rotatable plate member rotates about the rotation axis with respect to the frame member,
   wherein the spring member includes:
   a first axial section;
   a second axial section, an end of the first axial section being connected to the frame member, an end of the second axial section being connected to the rotatable plate member, a predetermined gap being formed between another end of the first axial section and another end of the second axial section;

a first zigzag section and a second zigzag section formed on opposite sides with respect to the rotation axis, each of the first and second zigzag sections including parallel portions which are parallel with each other and with the rotation axis and bent portions each connecting adjacent parallel portions, the bent portions being arranged in a direction perpendicular to the rotation axis, an end of the first zigzag section being connected to the other end of the first axial section, an end of the second zigzag section being connected to the other end of the second axial section, and the other end of the first zigzag section being connected to the other end of the second zigzag section.

2. The hinge structure according to claim 1, wherein the predetermined gap is smaller than a length of the parallel portions.

3. The hinge structure according to claim 1, wherein the first and second zigzag sections are symmetrical to each other about a point at which the other end of the first zigzag section is connected to the other end of the second zigzag section.

4. The hinge structure according to claim 1, wherein the parallel portions of each zigzag section are arranged at every predetermined interval.

5. The hinge structure according to claim 4, wherein the predetermined interval S satisfies a following condition:

$$4\ \mu m \leq S \leq 8\ \mu m.$$

6. The hinge structure according to claim 1, which is formed of an SOI wafer.

7. The hinge structure according to claim 6, wherein a width W of the spring member satisfies a following condition:

$$2\ \mu m \leq W \leq 4\ \mu m.$$

8. The hinge structure according to claim 6, wherein a thickness T of the spring member satisfies a following condition:

$$7\ \mu m \leq T \leq 13\ \mu m.$$

9. A hinge structure, comprising:
a rotatable plate member;
a frame member;
a spring member that connects the rotatable plate member with the frame member at each of two opposite positions along a rotation axis so that the rotatable plate member rotates about the rotation axis with respect to the frame member,
wherein the spring member includes:
a first axial section;
a second axial section, an end of the first axial section being connected to the frame member, an end of the second axial section being connected to the rotatable plate member, a predetermined gap being formed between another end of the first axial section and another end of the second axial section;
a first zigzag section and a second zigzag section arranged on both sides of the first axial section, respectively; and
a third zigzag section and a fourth zigzag section arranged on both sides of the second axial section, respectively,
wherein each of the first, second, third and fourth zigzag sections includes a plurality of parallel portions which are parallel with each other and with the rotation axis, and bent portions each connecting adjacent parallel portions, the bent portions being arranged in a direction perpendicular to the rotation axis, an end of the first zigzag section being connected to the other end of the first axial section, another end of the first zigzag section being connected to an end of the second zigzag section, another end of the second zigzag section being connected to an end of the third zigzag section, another end of the third zigzag section being connected to an end of the fourth zigzag section, and another end of the fourth zigzag section being connected to the other end of the second axial section.

10. The hinge structure according to claim 9, wherein the predetermined gap is smaller than a length of the parallel portions.

11. The hinge structure according to claim 9, wherein the second and third zigzag sections are symmetrical to each other about a point at which ends of the second and third zigzag sections are connected to each other, and wherein first and fourth zigzag sections are symmetrical to each other about the point at which the ends of the second and third zigzag sections are connected to each other.

12. The hinge structure according to claim 9, wherein the parallel portions of each zigzag section are arranged at every predetermined interval.

13. The hinge structure according to claim 12, wherein the predetermined interval S satisfies a following condition:

$$4\ \mu m \leq S \leq 8\ \mu m.$$

14. The hinge structure according to claim 9, which is formed of an SOI wafer.

15. The hinge structure according to claim 14, wherein a width W of the spring member satisfies a following condition:

$$2\ \mu m \leq W \leq 4\ \mu m.$$

16. The hinge structure according to claim 14, wherein a thickness T of the spring member satisfies a following condition:

$$7\ \mu m \leq T \leq 13\ \mu m.$$

17. A hinge structure, comprising:
a rotatable plate member;
a frame member;
a spring member that connects the rotatable plate member with the frame member at each of two opposite positions along a rotation axis so that the rotatable plate member rotates about the rotation axis with respect to the frame member,
wherein the spring member includes:
a first axial section;
a second axial section, an end of the first axial section being connected to the frame member, an end of the second axial section being connected to the rotatable plate member, a predetermined gap being formed between another end of the first axial section and another end of the second axial section;
a plurality of zigzag sections successively connected between the first axial section and the second axial section, one end of the plurality of successively connected zigzag sections being connected to the other end of the first axial section, another end of the plurality of successively connected zigzag sections being connected to another end of the second axial section, each of the plurality of zigzag sections includes a plurality of parallel portions which are parallel with the rotation axis, the plurality of zigzag sections being arranged symmetrically with respect to each other about a center point of a geometry defined by the plurality of zigzag sections.

18. The hinge structure according to claim 17, wherein the predetermined gap is smaller than a length of the parallel portions.

19. The hinge structure according to claim 17, wherein the parallel portions of each zigzag section are arranged at every predetermined interval.

20. The hinge structure according to claim 17, which is formed of an SOI wafer.

* * * * *